US012701281B2

(12) United States Patent
Ary et al.

(10) Patent No.: US 12,701,281 B2
(45) Date of Patent: Aug. 4, 2026

(54) SYSTEMS AND METHODS FOR GENERATING VIDEO SUGGESTIONS

(71) Applicant: Google LLC, Mountain View, CA (US)

(72) Inventors: Acar Ary, San Bruno, CA (US); Apoorv Kulshreshtha, Mountain View, CA (US); Mason Henry DiMarco, San Diego, CA (US)

(73) Assignee: Google LLC, Mountain View, CA (US)

( * ) Notice: Subject to any disclaimer, the term of this patent is extended or adjusted under 35 U.S.C. 154(b) by 195 days.

(21) Appl. No.: 18/244,568

(22) Filed: Sep. 11, 2023

(65) Prior Publication Data

US 2025/0088686 A1 Mar. 13, 2025

(51) Int. Cl.
*H04N 21/25* (2011.01)
*H04N 21/858* (2011.01)

(52) U.S. Cl.
CPC ......... *H04N 21/251* (2013.01); *H04N 21/858* (2013.01)

(58) Field of Classification Search
CPC ........................... H04N 21/251; H04N 21/858
USPC ............................................................. 725/9
See application file for complete search history.

(56) References Cited

U.S. PATENT DOCUMENTS

| | | | | | |
|---|---|---|---|---|---|
| 8,782,724 | B2 * | 7/2014 | Wang | ................. | H04N 21/8133 |
| | | | | | 709/248 |
| 10,636,449 | B2 * | 4/2020 | Vijil | ................... | H04N 21/4668 |
| 11,126,682 | B1 * | 9/2021 | Silverstein | .......... | G06F 16/4393 |
| 11,630,950 | B2 * | 4/2023 | Cheong | ................. | G06F 40/205 |
| | | | | | 704/9 |
| 11,682,223 | B1 * | 6/2023 | Zhang | ................... | G06F 40/289 |
| | | | | | 704/9 |
| 2011/0055223 | A1 * | 3/2011 | Elmore | ................... | G07F 17/32 |
| | | | | | 707/748 |
| 2011/0173191 | A1 * | 7/2011 | Tsaparas | ............... | G06F 16/313 |
| | | | | | 707/E17.084 |
| 2014/0365207 | A1 | 12/2014 | Convertino | | |

(Continued)

FOREIGN PATENT DOCUMENTS

CN 115114433 A 9/2022

OTHER PUBLICATIONS

Murakami, N., et al., "Emotional video ranking based on user comments", The 13th International Conference on Information Integration and Web-based Applications, pp. 499-502, 2011-12.

(Continued)

*Primary Examiner* — Sahar Aqil Riaz
(74) *Attorney, Agent, or Firm* — Lowenstein Sandler LLP

(57) ABSTRACT

A method for generating video suggestions to users of an online video streaming platform is provided. A video suggestion engine may scan and analyze the comments section of an online video to generate a sentiment score associated with the video. The sentiment score may be indicative of the level of association between a given sentiment and a given video. After, the video suggestion engine may suggest the video to a user, based on the computed sentiment score. In some cases, more than one sentiment score may be computed for a given video. In some cases, multiple sentiment scores may be computed for multiple videos. In some cases sentiment scores across videos can be compared to identify a video for suggesting to a user, and the method may generate a video suggestion based on such a comparison.

20 Claims, 9 Drawing Sheets

100

(56) References Cited

U.S. PATENT DOCUMENTS

| | | | |
|---|---|---|---|
| 2015/0346955 A1* | 12/2015 | Fundament | H04N 21/4821 |
| | | | 715/765 |
| 2017/0091839 A1* | 3/2017 | Cunico | G06F 16/90324 |
| 2018/0077440 A1* | 3/2018 | Wadhera | H04N 21/8456 |
| 2018/0113863 A1* | 4/2018 | Kuznetsov | G06F 16/435 |
| 2019/0139575 A1* | 5/2019 | Vijil | G11B 27/031 |
| 2020/0137429 A1* | 4/2020 | Strosaker | H04N 21/2668 |
| 2020/0154170 A1* | 5/2020 | Wu | H04N 21/4666 |
| 2021/0209150 A1 | 7/2021 | Kuznetsov | |
| 2021/0295177 A1* | 9/2021 | Joshi | G06N 5/04 |
| 2021/0358009 A1* | 11/2021 | Nygaard | G06Q 30/0631 |
| 2022/0014820 A1* | 1/2022 | Hannes | H04N 21/4532 |
| 2022/0198779 A1* | 6/2022 | Saraee | G06F 16/9535 |
| 2022/0269947 A1 | 8/2022 | Aarabi | |
| 2025/0045800 A1* | 2/2025 | Naidoo | H04N 7/15 |

OTHER PUBLICATIONS

Yew, J., et al., "Knowing Funny: Genre Perception and Categorization in Social Video Sharing", CHI 2011, May 7-12, 2011, Vancouver, BC, Canada, 11 pages.

* cited by examiner

700

SYSTEMS AND METHODS FOR GENERATING VIDEO SUGGESTIONS

TECHNICAL FIELD

The instant specification generally relates to systems and methods for generating video suggestions from online video content for a viewer.

BACKGROUND

Today, many video-streaming platforms (e.g., YouTube, Twitch, Facebook, etc.) have incorporated methods of suggesting videos that can be of interest to a user. Generating video suggestions has proven to enhance user engagement and retention with a video streaming platform. Through suggesting video content that aligns with a user's preferences and viewing history, such platforms can offer a more personalized and enjoyable viewing experience. This increases the likelihood that users will continue to watch platform-provided content, promotes longer engagement with the platform, and generally makes the platform more appealing to consumers, creators, advertisers, and other platform users.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

According to one aspect of the present disclosure, a method for suggesting a video for viewing to a user of a video streaming platform is provided. In some aspects, the method includes acquiring first comments from a first comments section associated with a first video; applying a first artificial intelligence (AI) model to the first comments to identify one or more first sentiment correlation indicators indicating a correlation between the first video and a sentiment; generating, using the one or more first sentiment correlation indicators, a first video sentiment score quantifying the correlation between the first video and the sentiment; and providing, using the first video sentiment score, the first video as a suggested video for viewing to the user of the video streaming platform.

In some aspects, a sentiment correlation indicator of the one or more first sentiment correlation indicators includes a portion of a comment of the first comments that indicates a correlation between the first video and the sentiment.

In some aspects, the first video sentiment score includes a measure of an amount of comments within the first comments section associated with the first video that indicate a correlation between the first video and the sentiment.

In some aspects, the sentiment includes at least one of happiness, nostalgia, comedy, romance, or a sentiment associated with a genre of music.

In some aspects, the method further includes acquiring second comments from a second comments section associated with a second video; applying the first AI model to the second comments to identify one or more second sentiment correlation indicators indicating a correlation between the second video and the sentiment; generating, using the one or more identified second sentiment correlation indicators, a second video sentiment score quantifying the correlation between the second video and the sentiment; and providing, the first video as a suggested video for viewing to the user of the video streaming platform, responsive to a comparison between the first video sentiment score and the second video sentiment score.

In some aspects, providing the first video as the suggested video is based at least on a determination that the first video sentiment score is higher than the second video sentiment score.

In some aspects, the first AI model is pre-trained to identify sentiment correlation indicators within natural language text.

In some aspects, the first comments include one or more user-posted emojis associated with the first video comments section.

In some aspects, the first AI model is trained by generating a first training dataset including: a first plurality of training comments, and a first plurality of ground truth labels indicating whether a given comment of the first plurality of training comments correlates with the sentiment. In some aspects, at least a subset of the first plurality of ground truth labels is generated using a second AI model. In some aspects, the first AI model is trained by training the first AI model using the first training dataset.

In some aspects, the second AI model is trained by generating a second training dataset including a second plurality of training comments, and a second plurality of human-annotated ground truth labels indicating whether a respective comment of the second plurality of training comments correlates with the sentiment; and training the second AI model using the second training dataset.

According to some embodiments of the disclosure, a pre-trained teacher LLM can be taken as a starting point (e.g. OpenAI's ChatGPT series LLM, or Google's Bard® or LaMDA LLM). The teacher LLM (at times referred to as a "teacher model," or "teacher AI model"), can be pre-trained to recognize and process many natural language elements. This teacher LLM can be trained to generate a large, labeled dataset of user-generated comments associated with an online video.

In some aspects, the first AI model is trained until the first AI model achieves at least 70% accuracy on a validation dataset.

In some aspects, a number of parameters of the second AI model is 10 or more times larger than a number of parameters of the first AI model.

In some aspects, a method for suggesting a video for viewing to a user of a video streaming platform is provided. In some aspects, the method includes acquiring first video content data associated with a first video; applying a first artificial intelligence (AI) model to the first video content data to generate a first video sentiment score quantifying a correlation between the first video and a sentiment; and providing, using the first video sentiment score, the first video as a suggested video for viewing to the user of the video streaming platform.

In some aspects, the method further includes generating a first training dataset including a first plurality of training comments. In some aspects, each comment within the first plurality of training comments is associated with a video of a first plurality of videos. In some aspects, the first training dataset further includes a first plurality of ground truth labels indicating whether a given comment of the first plurality of training comments correlates the associated video of the first plurality of videos with the sentiment. In some aspects, at least a subset of the first plurality of ground truth labels is generated using a second AI model. In some aspects, the method further includes generating, using the first dataset, a first plurality of sentiment scores quantifying the correlation between a given video of the first plurality of videos and the sentiment; generating a second training dataset including a first plurality of training video content data. In some aspects, each video content data within the first plurality of training video content data is the video content data of a video of a first plurality of videos. In some aspects, the second training dataset further includes a second plurality of ground truth labels indicating the sentiment score quantifying the correlation between a given video content data of the first plurality of training video content data and the sentiment. In some aspects, the method further includes training the first artificial intelligence (AI) model using the second training dataset.

In some aspects, training the first AI model using the first training dataset includes processing, using the first AI model, the given video content data to generate a video sentiment score quantifying the correlation between the given video content data and the sentiment; identifying a difference between the generated video sentiment score and the ground truth label of the second plurality of ground truth labels; and changing one or more parameters of the first AI model to reduce or eliminate the identified difference.

In some aspects, a system for suggesting a video for viewing to a user of a video streaming platform is provided. In some aspects, the system includes a memory device; and a processing device communicatively coupled to the memory device. In some aspects, the processing device is to: acquire first comments from a first comments section associated with a first video; apply a first artificial intelligence (AI) model to the first comments to identify one or more first sentiment correlation indicators indicating a correlation between the first video and a sentiment; generate, using the one or more first sentiment correlation indicators, a first video sentiment score quantifying the correlation between the first video and the sentiment; and provide, using the first video sentiment score, the first video as a suggested video for viewing to the user of the video streaming platform.

In some aspects, the processing device is to further: acquire second comments from a second comments section associated with a second video; apply the first AI model to the second comments to identify one or more second sentiment correlation indicators indicating a correlation between the second video and the sentiment; generate, using the one or more identified second sentiment correlation indicators, a second video sentiment score quantifying the correlation between the second video and the sentiment; and provide, the first video as a suggested video for viewing to the user of the video streaming platform, responsive to a comparison between the first video sentiment score and the second video sentiment score.

In some aspects, the first AI model is trained by: generating a first training dataset including a first plurality of training comments, and a first plurality of ground truth labels indicating whether a given comment of the first plurality of training comments correlates with the sentiment. In some aspects, at least a subset of the first plurality of ground truth labels is generated using a second AI model. In some aspects, the first AI model is further trained by training the first AI model using the first training dataset.

In some aspects, the second AI model is trained by: generating a second training dataset including a second plurality of training comments, and a second plurality of human-annotated ground truth labels indicating whether a respective comment of the second plurality of training comments correlates with the sentiment; and training the second AI model using the second training dataset.

BRIEF DESCRIPTION OF THE DRAWINGS

Aspects and embodiments of the present disclosure will be understood more fully from the detailed description given below and from the accompanying drawings of various aspects and embodiments of the disclosure, which, however, should not be taken to limit the disclosure to the specific aspects or embodiments, but are for explanation and understanding only.

DETAILED DESCRIPTION

Figure 1:
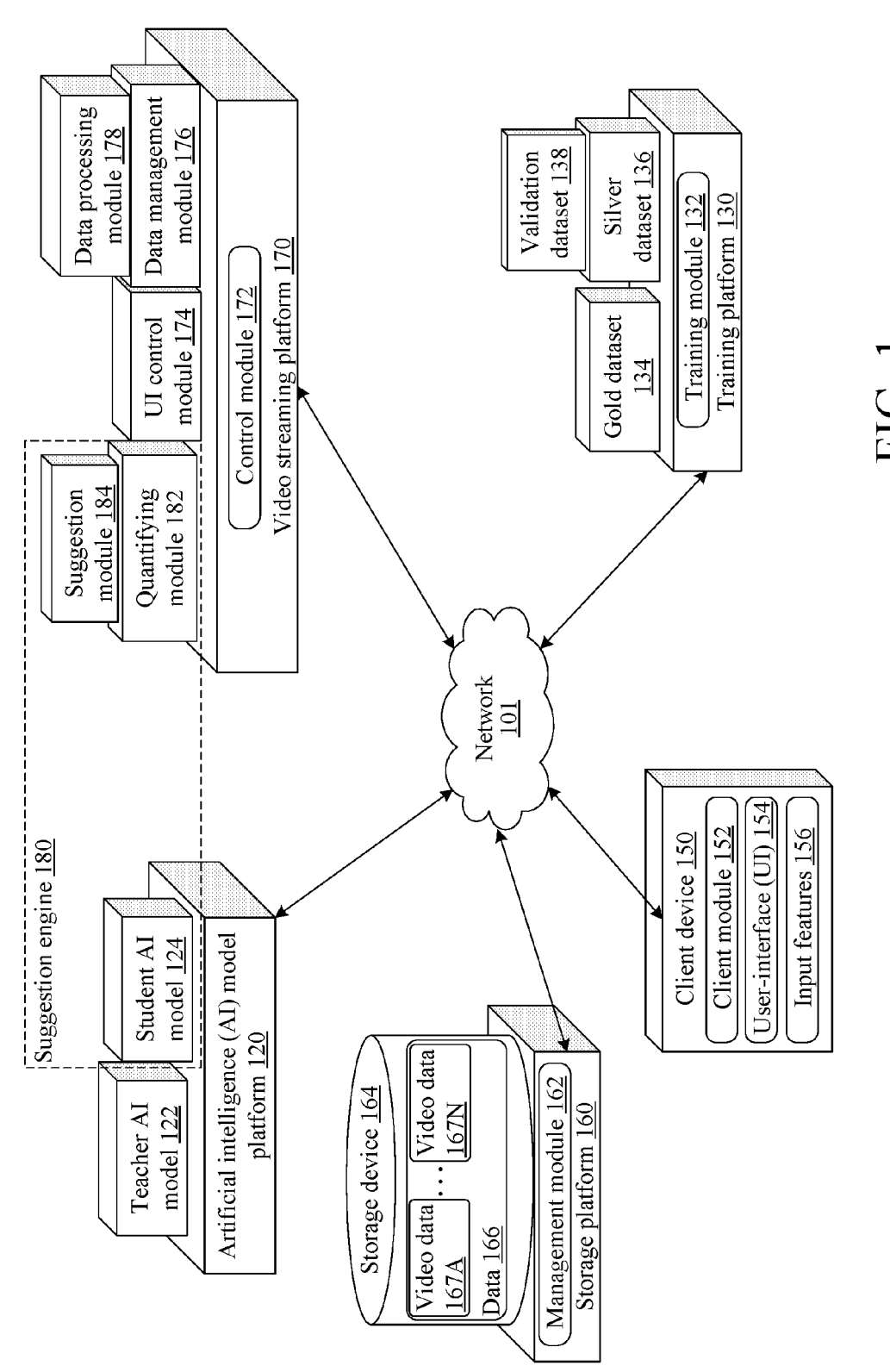
FIG. 1 illustrates an example system architecture capable of supporting a suggestion engine that generates a video suggestion, in accordance with one embodiment of the present disclosure.

Modern video streaming platforms may employ sophisticated algorithms and machine learning models to process data and generate video suggestions tailored to individual viewers. For example, current suggestion algorithms can analyze sources of user data, such as user viewing history, user search queries, and even the amount of time spent on specific videos, to identify patterns and preferences unique to each user. Through deep analysis of a combination of such individual (user-specific) and collective (platform-wide) data, a video streaming platform may generate unique videos suggestions for a particular user of the platform.

Despite the widespread adoption of video suggestion mechanisms, the current methods for generating video suggestions face some challenges. In particular, generating a video suggestion involves processing, sorting, and categorizing the video content of a video streaming platform. One difficulty in accomplishing this is the sheer volume and diversity of video content available today. For example, popular video streaming platforms can hold millions of hours of video content. Additional video content is constantly being uploaded across numerous genres and video formats. Devising algorithms that can efficiently sift through these vast repositories becomes a significant hurdle in itself. Maintaining system responsiveness and integrity in the face of such massive data accumulation requires substantial computational resources and efficient data handling.

In addition, the dynamic nature of online video content can make it difficult to accurately characterize and quantify various themes, elements, and human sentiments within a video. Unlike static text or images, video content often contains expansive and rapidly changing elements that may be difficult for algorithms to grasp and analyze. From rapidly shifting visual scenes to layered audio tracks and dialogues, the multi-dimensional aspect of videos presents challenges when attempting to identify and quantify associated video elements. Even through the use of sophisticated algorithms and AI, capturing the essence and sentiments of a video can remain a formidable challenge.

As disclosed herein, modern comments sections of online videos can be used for sorting, categorizing, and characterizing video data.

Today, many video-streaming platforms (e.g., YouTube®, Twitch®, Facebook®, etc.) have incorporated comments sections associated with videos hosted by the video-streaming platform. Such comments sections can serve as a communal space for a user (i.e., viewer) to share information, such as their thoughts, reactions, and impressions on a video's content. Since comments within a video comments section are public (i.e. viewable by anyone with access to the video), users of the platform can also engage with each other, and participate in discussions and exchanges of ideas communally, all within the comments section of a particular video.

Thus, user activities in the video comments sections can generate a reservoir of data on both the content of the online video, as well as the thoughts and impressions of users of the video-streaming platform. These comments within an online video comments section can be analyzed to extract and retrieve useful insights on the video's subject matter.

Thus, aspects and implementations of the present disclosure address the above challenges of modern video suggestion mechanisms and methods by providing systems and techniques for generating video suggestions through analysis of one or more video comments sections and the comments therein. In some embodiments, a suggestion engine is provided, capable of analyzing comments associated with a comments section and video, identifying and quantifying one or more sentiments associated with a video, and suggesting the video to a user of the platform based on the one or more identified sentiments. In some embodiments, more than one video may be analyzed, and the level or strength of identified sentiments can be compared to each other, to generate a single suggestion for a user.

To analyze comments sections efficiently, the proposed suggestion engine may employ natural language processing (NLP) algorithms that leverage machine-learning. By leveraging machine-learning, NLP algorithms can be automated and conducted on a large scale. As example end-results of such methods, NLP algorithms may classify comments in a comments section as positive or negative, as containing certain sentiments, or identify prevailing themes within a group of comments, to name a few possibilities.

According to some embodiments of the disclosure, a pre-trained teacher LLM can be taken as a starting point (e.g. OpenAI's ChatGPT series LLM, or Google's Bard® or LaMDA LLM). The teacher LLM (at times referred to as a "teacher model," or "teacher AI model"), can be pre-trained to recognize and process many natural language elements.

This pre-training can be trained to generate a large, labeled dataset of user-generated comments associated with an online video.

After a large labeled dataset of user-generated comments has been created using the teacher LLM, a smaller student LLM (e.g., with fewer parameters and an acceptable run-time, such as Google's BERT LLM) can be trained using the large, labeled dataset. This allows the student LLM (at times referred to as a "student model," or "student AI model"), to learn from the teacher LLM, without having to undergo the same level of extensive training, and without requiring as many parameters.

Once training of the student LLM has been accomplished, the student LLM can be deployed as a tailored tool in the analysis of user-generated comments.

When compared to the teacher LLM, the student LLM may have the advantage of having absorbed much of the training already accomplished within the teacher LLM, but may accomplish analysis with a much more reasonable run-time, due to smaller size (e.g., significantly fewer parameters). The advantages of the disclosed techniques include but are not limited to processing numerous comments and textual data, and extracting meaningful insights with reasonable training time, processing time, and expense.

Turning now to the figures, FIG. 1 illustrates an example system architecture capable of supporting a suggestion engine that generates a video suggestion, in accordance with one embodiment of the present disclosure. According to some embodiments, a video streaming system architecture (e.g. system architecture 100) is provided for processing, transmitting, and displaying video data to a user through a client device. The video streaming system architecture can include a suggestion module 180 for generating and delivering video suggestion to a user associated with the client device. The suggestion module 180 may leverage a student AI model 124 to support generating video suggestions.

The system architecture 100 (also referred to as "system" herein) may include a video streaming platform 170, an AI model platform 120, one or more connected client devices (e.g. client device 150), an AI model training platform 130, and a storage platform 160, each connected to a network 101. In some embodiments, video streaming platform 170, AI model platform 120, client device 150, AI model training platform 130, and storage platform 160 can include, can be, or can otherwise be connected to one or more computing devices (such as a rackmount server, a router computer, a server computer, a personal computer, a mainframe computer, a laptop computer, a tablet computer, a desktop computer, etc.), one or more storage devices (e.g., hard disks, memories, databases), networks, software components, and/or hardware components capable of connecting to system 100.

In some embodiments, network 101 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some embodiments, a video streaming platform, (e.g. platform 170) for hosting the video streaming services may include, or host, several modules for supporting system functionalities. Platform 170 can support a control module (e.g., control module 172), for performing overall control of modules and devices associated with the platform, a user-interface (UI) control module (e.g., UI control module 174), for performing generation, and other processes associated with a UI that will be presented through a client device. Platform 170 can support a data management module 176, that may gather and manage data (such as video data gathered from storage device 164 and storage platform 160), and a data processing module (e.g., data processing module 178), that may process, transmit, and receive, incoming and outgoing data and video streams. Platform 170 may further support a quantifying module 182 and a suggestion module 184, that may work in tandem, processing and video and video comment data to generate video suggestion(s). Such modules may work collaboratively, and communicate internally, or externally (e.g. to further systems and/or through APIs), to facilitate video streaming capabilities for users across a range of client devices.

In some embodiments, platform control module 172 may orchestrate the overall functioning of the video streaming platform 170. In some cases, platform control module 172 can include algorithms and processes to direct the setup, data transfer, and processing required for providing a video stream to a user. For example, when a user initiates engagement with the video streaming service system 100, the control module 172 may initiate and manage the associated process, including allocating resources, determining routing pathways for video and audio data streams, managing permissions, and so forth interact with client devices to establish and maintain reliable connections. Control module 172 may also control internal modules of (e.g. that are within) the video streaming platform 170.

UI control module 174 may perform user-display functionalities of the system such as generating, modifying, and monitoring the individual UI(s) and associated components that are presented to users of the platform 170 through a client device. For example, UI control module 174 can generate the UI(s) (e.g., UI 154 of client device 110) that users interact with while engaging with the video streaming platform. A UI may include many interactive (or non-interactive) visual elements for display to a user. Such visual elements may occupy space within a UI and may be visual elements such as windows displaying video streams, windows displaying images, chat panels, file sharing options, participant lists, or control buttons for functions such as muting audio, disabling video, screen sharing, and so forth. The UI control module 174 can work to generate such a UI, including generating, monitoring, and updating the spatial arrangement and presentation of such visual elements, as well as working to maintain functions and manage user interactions, together with the control module 172. Additionally, the UI control module 174 can adapt the interface based on the capabilities of client devices. In such a way the UI control module 174 can provide a fluid and responsive interactive experience for users of the video streaming platform.

In some embodiments, the data management module 176 may be responsible for the acquisition and management of video content. This may include gathering and directing video uploads by content creators, gathering and directing video content from storage platforms and storage devices (e.g. such as storage device 164), connection to third-party video content providers, or even live video feeds. Once video content is available, data management module 176 may perform tasks such as categorization, metadata tagging, copyright management, and other similar tasks. Data management module 176 can also be primarily responsible for communicating with external data storage (e.g. storage device 164 and storage platform 160), to store received video data, or acquire previously stored video data for manipulation or transmission. Data management module

176 may include a database interface module (DIM). Thus, module 176 may not only direct storage of these types of video data but often also manages metadata associated with the videos, including titles, descriptions, tags, thumbnails, and more.

In some embodiments, data management module 176 may work hand-in-hand with data processing module 178, which may receive, process, and transmit real-time video (and audio) data streams to associated client devices. In some cases, data processing module 178 may be equipped to receive, transmit, encode, decode, compress, or otherwise process video data streams for efficient delivery to or from devices, modules or platforms, etc. (and as controlled by control module 172).

In practice, processing module 178 can modify the quality of video streams in response to changes in network conditions (e.g., bandwidth fluctuations) or client device capabilities, to maintain stable and high-quality video streams and overall system functionality. Processing module 178 may also include advanced capabilities through access to more sophisticated computer algorithms, and may implement advanced processing features such as noise reduction, video enhancement (e.g. quality upscaling), to name just a few examples, all with the intent of optimizing video processing in support of the control module, video streaming system, and its users at large.

Once the data processing module 178 has received and processed video streams (as described in previous paragraphs), it may transmit the data to associated client devices over a network (or any other connection method). Depending on the network conditions and capabilities of each client device, different versions of the same video stream, encoded at different bitrates or resolutions, may be sent to different devices to ensure the best possible video quality for each client device.

Some data, such as textual input (e.g., comments, or textual commands associated with the video navigation, etc.), participant reactions, and control commands (user interactions with control elements of the UI) may not be received by the data processing module or data management module, but instead by the control module 172, which may process specific inputs and coordinate with other modules to update UIs, video streams, and data on all connected devices and modules as needed.

For example, for a function such as video navigation (e.g., fast-forwarding, rewinding, etc.), user inputs from client devices may be received directly by platform control module 172. In the case of a control command, like a video selection command from a client device, the control module 172 may direct the data management module 176 to acquire the necessary data from storage platform 160, and direct data processing module 178 and UI control module 174 to effectively transfer such a video and its associated data to the connected client device. In such a way, transmitting, receiving, and processing of both video and non-video data by the video streaming platform 170 from one or more connected client devices (e.g., client device 150) may be coordinated by the control module 172 in tandem with other associated modules and platforms, as seen in FIG. 1.

In some embodiments, the video streaming platform 170 may suggest, or promote, video content to a user of the system. For example, in some instances, the UI generated by module 174 may include a region for video suggestions (as will be further seen and described with respect to FIG. 6), that list, or present, various videos and video content that the system has determined to suggest to a user. Platform 170 may employ quantifying module 182, suggestion module

184, and suggestion engine 180 at large to identify videos from a stored number of videos to present to a user for suggestion. Such a suggestion process, and suggestion engine 180, will be further described in detail with respect to FIGS. 2-5.

In some embodiments, one or more client devices (e.g. client device 150) can be connected to the system 100. Client devices, under direction by the video streaming platform when connected, can present (e.g. display) a UI (e.g., as created by control module 174) to a user of a respective device through a client module. The client devices may also collect input from users through input features. In some embodiments, the client device(s) can each include computing devices such as personal computers (PCs), laptops, mobile phones, smart phones, tablet computers, netbook computers, notebook computers, network-connected televisions, etc. In some embodiments, client device(s) may also be referred to as "user devices."

In some embodiments, client devices (e.g. client device 150) connected to the system can each include a client module (e.g., client module 152). In some embodiments, the client module may be an application that provides the user interface (UI) (e.g., UI 154) and manages transmissions, inputs, and data to and from platform 170. In some embodiments, the client module (e.g. that provides the UI) can be, or can include, a web browser, a mobile application, a desktop application, etc.

In some embodiments, the system (or any associated platforms), may transmit any data, including audio, video, and textual data, to the client device through client module 152, to user interface. Such data that can be transmitted to the client device through module 152 can include, for example, UI information, textual information, video information associated with the video-streaming system at large, or queries or decisions for which the platform requires user input. In some embodiments, a client module 152 (e.g. such as a dedicated application) incorporated within the client device 150 and may perform function associated with the end-user interface. Primarily, client module 152 can receive and render video, audio, and UI data, accept user inputs, and provides various playback controls (e.g., play, pause, volume adjustment, and video navigation) to the user. Client module 152 may also adjust the streaming quality (or generate requests for adjustment) in real-time, based on the network conditions and device capabilities.

As will be discussed in further detail with respect to FIG. 6, a UI may can include various visual elements and regions, and may be the primary mechanism by which the user engages with the video streaming platform, and system at large. In some embodiments, the UI(s) of the client device(s) can include multiple visual elements and regions that enable presentation of information, for decision-making, content delivery, etc. to a user of the device. In some embodiments, the UI may sometimes be referred to as a graphical user interface (GUI)).

In some embodiments, the UI(s) and/or client device can include input features 156 to intake information from a user. In one or more examples, a user of client device can provide input data (e.g. a user query, control commands, etc.) into an input features 156 of the user device and/or client module, for transition to the video streaming platform, and system at large. Input features 156 of client device 150 can include space, regions, or elements of the UI 154 that accept user inputs. For example, input features 156 may be visual elements such as buttons, text-entry spaces, selection lists, drop-down lists, etc. For example, in some embodiments, input features 156 may include a chat box which a user of client device may use to input textual data (e.g. a user query) into. The client module 152 may then transmit that textual data to platform 170, and the system at large, for further processing. In other examples, input features 156 may include a selection list, in which a user of client device can input video selection data e.g., by selecting, or clicking, on a suggested video from a presented list of suggested videos. The client module 152 may then transmit that selection data to platform 170, and the system at large, for further processing.

In some embodiments, the client device can capture audio, video, and textual data from a user of the client device and transmit the captured data through the playback module to the video streaming platform. Such data can include audio, video, and textual data from a user of the client device. In some embodiments, the client device may transmit the captured data to any of the system platform(s) for further processing. Such captured data can be any kind of input data associated with a conventional mouse and keyboard, or other similar input system (e.g., that associated with other types of client devices such as a personal phone). Such data can be transmitted to any system platform and/or any of its associated modules. In an example, such captured data that can be transmitted to the video streaming platform can include, video streaming data that user intends to publish or broadcast via the video streaming platform, inputs and directives for the video streaming platform and/or any of its associated modules, or user queries for the video streaming platform to use.

As will be described in further detail with respect to FIG. 6, In some embodiments, the UI(s) can include one or more UI element(s) that support a user input feature 156 (e.g. such as a query space, a video selection space, or a video comment entry space, etc.). Such an input feature 156 may be used by the user to make a selection regarding a video suggestion.

In some embodiments, as will be discussed in further detail below, functionalities of the system 100 (and any of the associated modules) can leverage an artificial intelligence (AI) model platform 120, for accessing and communicating with one or more AI models (e.g., teacher AI model 122 and/or student AI model 124) supported by AI model platform 120. In some embodiments, platform 120 may include an interface (not shown in FIG. 1) for communicating to and from the AI model(s). AI models 122 and 124 will be described in further detail with respect to FIG. 2-5, below.

In some embodiments, the teacher AI model 122 can be a generative large language model (LLM). In some embodiments, the teacher AI model 122 can be a large language model that has been pre-trained on a large corpus of data so as to process, analyze, and generate human-like text based on given input. Teacher AI model 122 may have any typical architecture for LLMs, including one or more architectures as seen in Generative Pre-trained Transformer series (Chat GPT series LLMs), Google's, Bard®, or LaMDA, or leverage a combination of transformer architecture with pre-trained data to create coherent and contextually relevant text. In some embodiments, the teacher AI model 122 can be a generative large language model (LLM).

In some embodiments, the student AI model 124 can be a large language model that has been pre-trained on a large corpus of data so as to process, analyze, and generate human-like text based on given input. Student AI model 124 may have any typical architecture for LLMs, including one or more architectures as seen in Bidirectional Encoder Representations from Transformers (BERT), Generative Pre-trained Transformer series (Chat GPT series LLMs), or leverage a combination of transformer architecture with pre-trained data to create coherent and contextually relevant text.

In some embodiments, AI models 122 and/or 124 may be (or may correspond to) one or more computer programs executed by processor(s) of AI model platform 120. In other embodiments, AI model may be (or may correspond to) one or more computer programs executed across a number or combination of server machines. For example, in some embodiments, AI models 122 and/or 124 may be hosted on the cloud, while in other embodiments, these AI models may be hosted and perform operations using the hardware of a client device. In some embodiments, any one of AI models 122 and/or 124 may be a self-hosted AI model, while in other embodiments, any one of AI models 122 and/or 124 may be an external AI model only accessed by an API.

In some embodiments, storage platform 160 may host and manage storage device 164. In some embodiments, a management module 162 may be used to manage communications, and storage device 164. In some embodiments, platform 160 may be a dedicated server for supporting storage device 164 accessible via network 101.

A management module, (e.g., management module 162) may reside at, or within, platform 160. The management module may oversee, regulate, and optimize operation associated with the storage device 164. The management module 162 may further accomplish tasks including, handling requests directed towards the storage device 164, ensuring the integrity and security of the data, managing backups, and orchestrating efficient use of storage resources provided by platform 160.

In some embodiments, when a data request or command is made to storage device 164, the request of command may first interface with the management module 162. The management module 162 may processes a request and determine the most efficient way to execute the request using the resources of the storage platform 160. Subsequently, the required data operations may be performed on storage device 164 and data 166, leveraging the underlying capabilities of the storage platform 160.

In some implementations, storage device 164 may be a persistent storage that is capable of storing data and/or metadata, as well as data structures to tag, organize, and index the data and/or metadata. In some embodiments, storage device 164 may store data 166, which may include video data 167A-N (which may include video content data, associated audio data, associated video metadata, etc.) as well as data structures to tag, organize, and index the data. Data 166 may include audio, video, text, or any other type of storable data, in accordance with embodiments described herein. embodiments described herein.

In some embodiments, storage device(s) 164 may store video data 167A-N, where each distinct unit of video data (e.g., video data 167A, video data 167B, etc.) may be data pertaining to a unique, displayable video of the video streaming platform. As will be further described in FIG. 2-4, each data unit associated with a single video (e.g., video data 167A, video data 167B, etc.), may include many types of video data that are associated with the unique video. For example, each unique data unit of video data 167A-N can include, the video content data (which may be encoded in formats like MP4, AVI, MKV, etc.), audio data (which may be encoded in formats such as AAC, MP3, or WAV., etc.), metadata (which can include a number of data such as video titles, descriptions, video durations, timestamps, upload information keywords, target frame rates, etc.), etc. One of ordinary skill in the art, having the benefit of this disclosure, will appreciate that there exist many useful data types and formats that may further be stored with a distinct video data unit, and that the above list is non-exhaustive. Furthermore, the above list will be further described with respect to FIG. 2-4.

In addition to the above, each unit of video data 167A-N (e.g., video data 166A, video data 166B, etc.) may include data associated with the video's comments section. As will be further described in FIG. 2-4, comments section data can include at least a series of comments within the comments section, including the textual comments that users have made in the comments section of the video. Other data that may be included within the comments section data may include timestamps, user identifiers to identify the user that made the comment, the number of likes/dislikes on a comment, etc.

Thus, in some embodiments, storage device 164 may house video data 167A-N, including a variety of data associated with each unit of video data. In some embodiments, any, or all of such data 167A-N may be accessed by video streaming platform 170 (or other modules and platforms of the system), for further processing.

The system may further include a training platform 130 that hosts a training module 132 that can be used to train one or more machine learning modules (e.g., teacher AI model 122 and/or student AI model 124). In some embodiments, training platform may also include, or have access to training datasets. In some embodiments, training platform 130 may host, or include or access, a gold dataset 134, a silver dataset 136, and a validation dataset 138, which will be described in further detail with respect to FIG. 5. In some embodiments, training module 132 may access a dataset, may preprocess a dataset, may feed the dataset to an AI model, and may evaluate the performance of a dataset (e.g., through use of a validation dataset). In some embodiments, the training module 132 may access and leverage typical machine learning tools, including libraries and frameworks such as TensorFlow, PyTorch, Keras, etc., and deliver iterative training to an AI model.

In some embodiments, quantifying module 182, suggestion module 184, and student AI model 124 may be used to form a suggestion engine 180. The specific functions and capabilities of suggestion engine 180 will be further described with respect to FIG. 2-5. Suffice to say presently, that suggestion engine 180 may be used to identify a video to suggest to a user. Suggestion engine 180 may leverage student AI model 124 to create comment flags, or abstractions, of the comments data of a video, quantifying module 182 may then process the flags to determine one or more sentiment intensities for a video, and suggestion module 184 may match a video with a client device and/or user profile, based on the sentiment intensities for the video. The platform may then suggest the selected video to a user, through a video suggestion list of a UI.

In some embodiments, any of the modules and or platforms can host or leverage an AI model (e.g. a local AI model) for decision making associated with the respective module.

In one embodiment, such an AI model (including AI models 122 and 124) may be one or more of decision trees, random forests, support vector machines, or other types of machine learning models. In one embodiment, such an AI model may be one or more artificial neural networks (also referred to simply as a neural network). The artificial neural network may be, for example, a convolutional neural network (CNN) or a deep neural network.

In one embodiment, processing logic performs supervised machine learning to train the neural network.

In some embodiments, the artificial neural network(s) may generally include a feature representation component with a classifier or regression layers that map features to a target output space. A convolutional neural network (CNN), for example, may host multiple layers of convolutional filters. Pooling may be performed, and non-linearities may be addressed, at lower layers, on top of which a multi-layer perceptron is commonly appended, mapping top layer features extracted by the convolutional layers to decisions (e.g., classification outputs). The neural network may be a deep network with multiple hidden layers or a shallow network with zero or a few (e.g., 1-2) hidden layers. Deep learning is a class of machine learning algorithms that use a cascade of multiple layers of nonlinear processing units for feature extraction and transformation. Each successive layer uses the output from the previous layer as input. Neural networks may learn in a supervised (e.g., classification) and/or unsupervised (e.g., pattern analysis) manner. Some neural networks (e.g., such as deep neural networks) include a hierarchy of layers, where the different layers learn different levels of representations that correspond to different levels of abstraction. In deep learning, each level learns to transform its input data into a slightly more abstract and composite representation.

In some embodiments, such an AI model may be one or more recurrent neural networks (RNNs). An RNN is a type of neural network that includes a memory to enable the neural network to capture temporal dependencies. An RNN is able to learn input-output mappings that depend on both a current input and past inputs. The RNN will address past and future measurements and make predictions based on this continuous measurement information. One type of RNN that may be used is a long short-term memory (LSTM) neural network.

As indicated above, such an AI model may include one or more generative AI models, allowing for the generation of new and original content, such a generative AI model may include aspects of a transformer architecture, or a GAN architecture. Such a generative AI model can use other machine learning models including an encoder-decoder architecture including one or more self-attention mechanisms, and one or more feed-forward mechanisms. In some embodiments, the generative AI model can include an encoder that can encode input textual data into a vector space representation; and a decoder that can reconstruct the data from the vector space, generating outputs with increased novelty and uniqueness. The self-attention mechanism can compute the importance of phrases or words within a text data with respect to all of the text data. A generative AI model can also utilize the previously discussed deep learning techniques, including recurrent neural networks (RNNs), convolutional neural networks (CNNs), or transformer networks. Further details regarding generative AI models are provided herein.

In some embodiments, such an AI model can be an AI model that has been trained on a corpus of textual data. In some embodiments, the AI model can be a model that is first pre-trained on a corpus of text to create a foundational model, and afterwards fine-tuned on more data pertaining to a particular set of tasks to create a more task-specific, or targeted, model. The foundational model can first be pre-trained using a corpus of text that can include text context in the public domain, licensed content, and/or proprietary content. Such a pre-training can be used by the model to learn broad language elements including general sentence structure, common phrases, vocabulary, natural language structure, and any other elements commonly associated with natural language in a large corpus of text.

In some embodiments, the AI model can then be further trained and/or fine-tuned on organizational data, including proprietary organizational data. The AI model can also be further trained and/or fine-tuned on comment data associated with a video streaming platform, or video streaming systems at large.

In some embodiments, such an AI model may include one or more pre-trained models, or fine-tuned models. In a non-limiting example, in some embodiments, the goal of the "fine-tuning" may be accomplished with a second, or third, or any number of additional models. For example, the outputs of the pre-trained model may be input into a second AI model that has been trained in a similar manner as the "fine-tuned" portion of training above. In such a way, two more AI models may accomplish work similar to one model that has been pre-trained, and then fine-tuned.

In some embodiments, storage device 164 may be hosted by one or more storage devices, such as main memory, magnetic or optical storage-based disks, tapes or hard drives, network-attached storage (NAS), storage area network (SAN), and so forth. In some embodiments, storage device 164 may be a network-attached file server, while in other embodiments, storage device 164 may be or host some other type of persistent storage such as an object-oriented database, a relational database, and so forth.

In some embodiments, storage device(s) 164 may be hosted by any of the platforms or device associated with system 100 (e.g. video streaming platform 170). In other embodiments, storage device 164 may be on or hosted by one or more different machines (e.g., video streaming platform 170 and AI model platform 120) coupled to the video streaming platform via network 101. In some implementations, the storage device 164 may store portions of audio, video, or text data received from the client devices (e.g. client device 110) and/or any platform and any of its associated modules.

In some embodiments, any one of the associated platforms (e.g. video streaming platform 170) may temporarily accumulate and store data until it is transferred to storage devices 164 for permanent storage.

It is appreciated that in some implementations, the functions of platforms 120, 130, 160, and/or 170 may be provided by a fewer number of machines. For example, in some implementations, functionalities of platforms 120, 130, 160, and/or 170 may be integrated into a single machine, while in other implementations, functionalities of platforms 120, 130, 160, and/or 170 may be integrated into multiple, or more, machines. In addition, in some implementations, only some platforms of the system may be integrated into a combined platform.

While the modules of each platform are described separately, it should be understood that the functionalities can be divided differently or integrated in various ways within the platform while still applying similar functionality for the system. Furthermore, each platform and associated modules can be implemented in various forms, such as standalone applications, web-based platforms, integrated systems within larger software suites, or dedicated hardware devices, just to name a few possible forms.

In general, functions described in embodiments as being performed by platforms 120, 130, 160, and/or 170 may also be performed by client devices (e.g. client device 150). In addition, the functionality attributed to a particular component may be performed by different or multiple components operating together. Platforms 120, 130, 160, and/or 170 may also be accessed as a service provided to other systems or devices through appropriate application programming interfaces, and thus is not limited to use in websites.

It is appreciated that in some implementations, platforms 120, 130, 160, and/or 170, or client devices of the system (e.g. client device 150) and/or storage device 164, may each include an associated API, or mechanism for communicating with APIs. In such a way, any of the components of system 100 may support instructions and/or communication mechanisms that may be used to communicate data requests and formats of data to and from any other component of system 100, in addition to communicating with APIs external to the system (e.g., not shown in FIG. 1).

In some embodiments of the disclosure, a "user" may be represented as a single individual. However, other implementations of the disclosure encompass a "user" being an entity controlled by a set of users and/or an automated source. For example, a set of individual users federated as a community in a social network may be considered a "user." In another example, an automated consumer may be an automated ingestion pipeline, such as a topic channel.

In situations in which the systems, or components therein, discussed here collect personal information about users, or may make use of personal information, the users may be provided with an opportunity to control whether the system or components collect user information (e.g., information about a user's social network, social actions or activities, profession, a user's preferences, or a user's current location), or to control whether and/or how to receive content from the system or components that may be more relevant to the user. In addition, certain data may be treated in one or more ways before it is stored or used, so that personally identifiable information is removed. For example, a user's identity may be treated so that no personally identifiable information may be determined for the user, or a user's geographic location may be generalized where location information is obtained (such as to a city, ZIP code, or state level), so that a particular location of a user cannot be determined. Thus, the user may have control over how information is collected about the user and used by the system and components.

Figure 2:
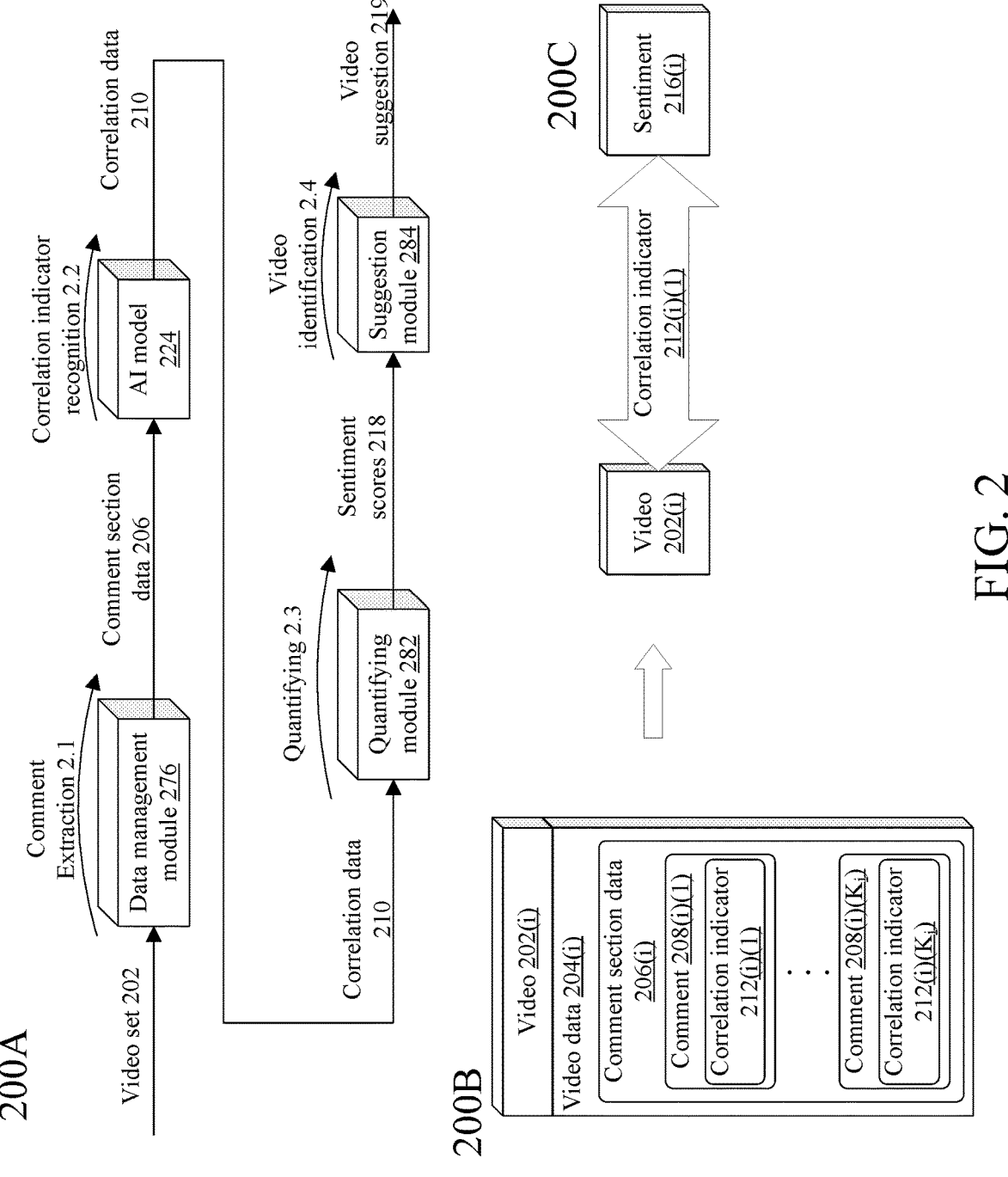
FIG. 2 illustrate a process for generating a video suggestion through the suggestion engine of FIG. 1, in accordance with some embodiments of the present disclosure.

FIG. 2 illustrates a process for generating a video suggestion using the suggestion engine of FIG. 1, in accordance with some embodiments of the present disclosure. More specific details of the process will be provided with respect to FIGS. 3-5.

In some embodiments, FIG. 2 illustrates a process 200A of generating a video suggestion 219 to a user of the system.

In some embodiments, similar features and components as were described in conjunction with FIG. 1 may be used in the process 200A illustrated in FIG. 2. For example, process 200A may leverage a data management module 276, which may correspond, or be similar, to data management module 176 as seen and described in FIG. 1, and incorporate and augment at least the embodiments described therein. In some embodiments, process 200A may leverage an AI model 224 that may correspond, or be similar, to student AI model 124 as seen and described in FIG. 1, and incorporate and augment at least the embodiments described therein. In some embodiments, process 200A may use a quantifying module 282 that may correspond, or be similar, to quantifying module 182 as seen and described in FIG. 1, and incorporate and augment at least the embodiments described therein. In some embodiments, process 200A may use a suggestion module 284 that may correspond, or be similar, to suggestion module 184 as seen and described in FIG. 1, and incorporate and augment at least the embodiments described therein.

To begin, process 200A may intake a video set that indicates a group of videos to be processed. For example, video set 202 may indicate a group of videos of any amount of videos (even an amount of N=1 videos). In some embodiments, video set 202 may indicate hundreds, or more videos.

At comment extraction 2.1, data management module 276 may process video set 202, and gather the comments section data associated with each video.

Figure 6:
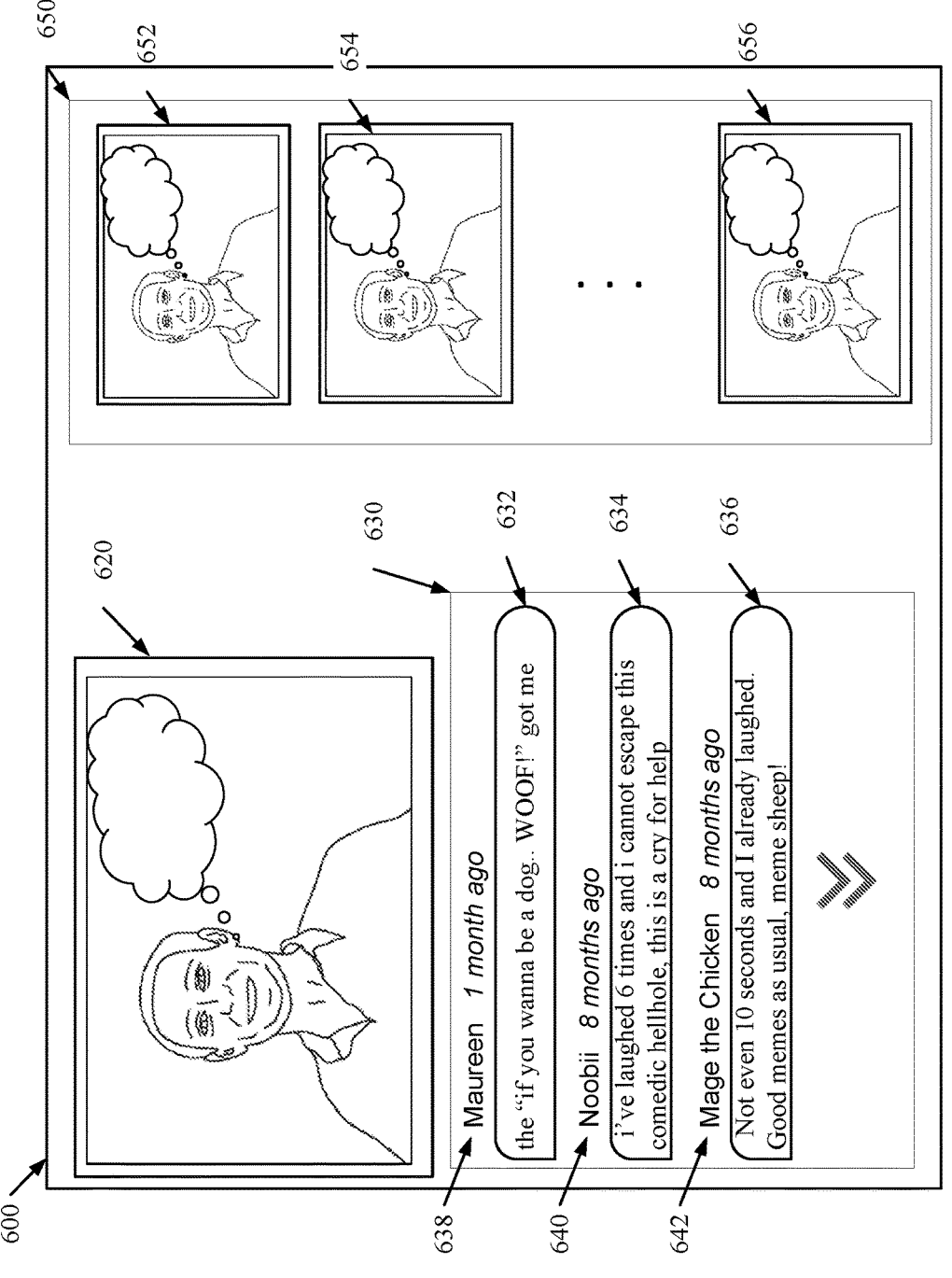
FIG. 6 illustrates an example user interface (UI) for the system of FIG. 1, in accordance with some embodiments of the present disclosure.

As was discussed with respect to FIG. 1, the video data associated with each video may include a comments section, which may include a number of comments associated with a video (such a comments section will be further illustrated in FIG. 6). A video's comments section may include any number of user-generated comments.

Example video data structure 200B illustrates an example video 202($i$) and associated video data 204($i$). As described above and in FIG. 1, video data 204($i$) may be associated with a specific video 202($i$) may include comments section data 206($i$), which may include any number of comments. Since the number of comments within a video's comments section may vary, the total number of comments within a comments section may be denoted by $K_i$ for a comments section and data 206($i$). For a comments section data 206($j$), the total number of comments may be denoted by $K_j$ and so on and so forth.

After comment extraction 2.1 has been performed, the process may deploy an AI model 224 to gather correlation data 210 from the comments section data 206.

As seen in video data structure 200B, each comment within the comments section data may include a correlation indicator. For example, as seen in structure 200B, a comment 208($i$)(1) may include a corresponding correlation indicator 212($i$)(1). Comment 208($i$)($K_i$) may similarly include correlation indicator 212($i$)($K_i$), and so on and so forth, for all comments within the comments section data 206($i$).

Data structure 200B illustrates two comments (i.e., comment 208($i$)(1) and comment 208($i$)($K_i$)), that each include a correlation indicator. However, not all comments within comments section data 206($i$) may include a correlation indicator. In some embodiments, any number of comments ranging from none, to all of the comments (N=$K_i$) within the comments section may include a correlation indicator. In some embodiments, each comment may include more than one correlation indicator.

As described in more detail below, in conjunction with FIG. 3, each correlation indicator may be (or include) a portion of a comment, such as a passage of text, an emoji, an inserted image, and/or the like. Correlation indicators may characterize a degree to which a video may be correlated with a specific sentiment.

As seen in relationship data structure 200C, a correlation indicator may indicate that there exists a correlation between the video associated with the comment including the correlation indicator, and a given sentiment. In other words, the correlation indicator may indicate a link between a given video, and a given sentiment. As seen in structure 200C, the correlation indicator 212($i$)(1) may indicate a correlation, or relationship, exists between the associated video 202($i$), and a given sentiment 216($i$).

Since each comment may, or may not, include a correlation indicator, correlation indicator recognition 2.2 may sift through all comments for a given video, for all videos within video set 202, and identify which comments do or do not include a correlation indicator. In some embodiments, correlation indicator recognition may produce a set of flags, or meta-indicators, that indicate whether each comment includes a correlation indicator or not. These flags, or meta-indicators, may be exported as correlation data 210.

In some embodiments, the more correlation indicators that are present within the comments within a specific comments section, the stronger the correlation with a specific sentiment may be. For example, with respect to data structures 200B and 200C, if a large number of comments within comments section data 206(*i*) include a correlation indicator, this may reflect that a large number of viewers of the video have correlated the video with a distinct sentiment, and that the video's relationship, or association, with such a sentiment is strong. In other embodiments, if only a few, less, or no comments of comments section data 206(*i*) include a correlation indicator, this may indicate that the correlation with a specific sentiment is weak, or does not exist.

In some embodiments, AI model 224 may be trained to recognize correlation indicators from a comment for a specific sentiment. In some embodiments, such a sentiment that may be indicated by a correlation indicator may be one of the following: happiness, joy, sadness, anger, fear or anxiety, inspiration, disgust, romance or love, nostalgia, informational-orientation, educational, comedy and/or humor, action, violence, hate, musical-orientation or specific sentiments of specific music genres, or any other sentiments or qualities commonly associated with a video. Thus, a given comment from a comments section may indicate that the user that generated the comment found a correlation between the respective video and any of the above listed or additional sentiments.

In some embodiments, AI model 224, may be trained to scan the comments section data 206 and identify correlation indicators for a single, unique sentiment. Thus, in some embodiments, process 200A may be repeated, with a different AI model that is trained to recognize a different, unique sentiment. In such a way, correlation indicators can be recognized and extracted for any number of different sentiments, for any number of videos.

In some embodiments AI model 224 may only generate flags, or meta-indicators, or other binary output indicating whether a comment includes a correlation indicator or not. In other embodiments, the output of AI model 224 may be non-binary, and indicate a strength or level of correlation indicated by the correlation indicator. For example in some embodiments, with reference to the sentiment of comedy, a first user may have found a video to be extremely comedic, while a second user may have found the same video to be slightly comedic, both may have left comments indicating such. In some embodiments, AI model 224 may identify both comments as including a correlation indicator with comedy, and generate flags indicating such. In other embodiments, AI model 224 may generate a non-binary output (e.g., such as a scale, or ranking), indicating the level or strength of the correlation indicator with the given sentiment. For example, the output associated with the first user's comment may indicate the correlation indicator indicates a stronger correlation than the output associated with the second user's comment.

After such correlation data 210 is generated, at operation 2.3, a quantifying module 282 may quantify the data to generate sentiment scores 218 (at times referred to as "sentiment intensity scores," or "intensity scores" herein). Sentiment scores 218 may include individual sentiment scores that indicate the level of correlation between a given video, and a given sentiment. For example, the embodiment where a meta-indicator is generated for each comment within comments section data 206, quantifying 2.3 may simply add, or sum, the total number of comments including correlation indicators. Thus, a level, or strength, of the association between a given video and a given sentiment can be formed, for each video. This data can be used to form a sentiment score for each video.

In some embodiments of the process 200A, one or more operations of comment extraction 2.1, correlation indicator recognition 2.2 and quantifying 2.3 may be combined into one operation accomplished by AI model 224. For example, in some embodiments, AI model 224 may be pre-trained to generate sentiment scores 218 directly from comments section data 206. In other embodiments, AI model 224 may not intake comments section data at all, and may instead be trained to predict sentiment scores directly from the video data (e.g., from video content data within video data 204(*i*)). Such embodiments will be further described with respect to FIG. 5. One or more of the subprocesses of process 200A may be combined, through use of varying AI models.

After sentiment scores are generated from the correlation data, the suggestion module 284 may identify videos of video set 202 to suggest to a user at video identification 2.4. In some embodiments, the video suggestion 219 may be identified based on the sentiment scores. For example, in some embodiments, a video set may be processed by process 200A to identify the sentiment scores for the sentiment of comedy. Then, the video with the highest sentiment score, may be chosen for suggestion to a user. In some embodiments, such a process may rely on the theory that if many users have found a particular video to contain a sentiment, a future user may likely also find the video to contain that sentiment. In the instance of comedy, a video with a high sentiment score may be presented to a user that has indicated an interest in comedy, but in other embodiments a video with a high sentiment score may be presented to any user demonstrating any interest in that sentiment.

For example, in some embodiments, videos scoring highly with respect to the sentiment of a certain musical genre may be presented to a user who has shown an interest in that particular genre, videos scoring highly with respect to the sentiment of action or mystery may be suggested to users that have indicated a predilection for such, and so on and so forth.

In some embodiments, videos scoring highly with respect to a particular sentiment may be discarded by the suggestion module. For example, if a user has indicated a disinterest (e.g., through past viewing habits) in a particular sentiment, a video with a high sentiment score for that sentiment may be passed over.

Thus, process 200A may intake a set of videos, generate sentiment scores for each video, and provide a way for suggestion module 284 to relevantly suggest a specific video, or group of videos, to a user of the system.

A more detailed description of the subprocesses, components, and data structures will now be provided.

Figure 3:
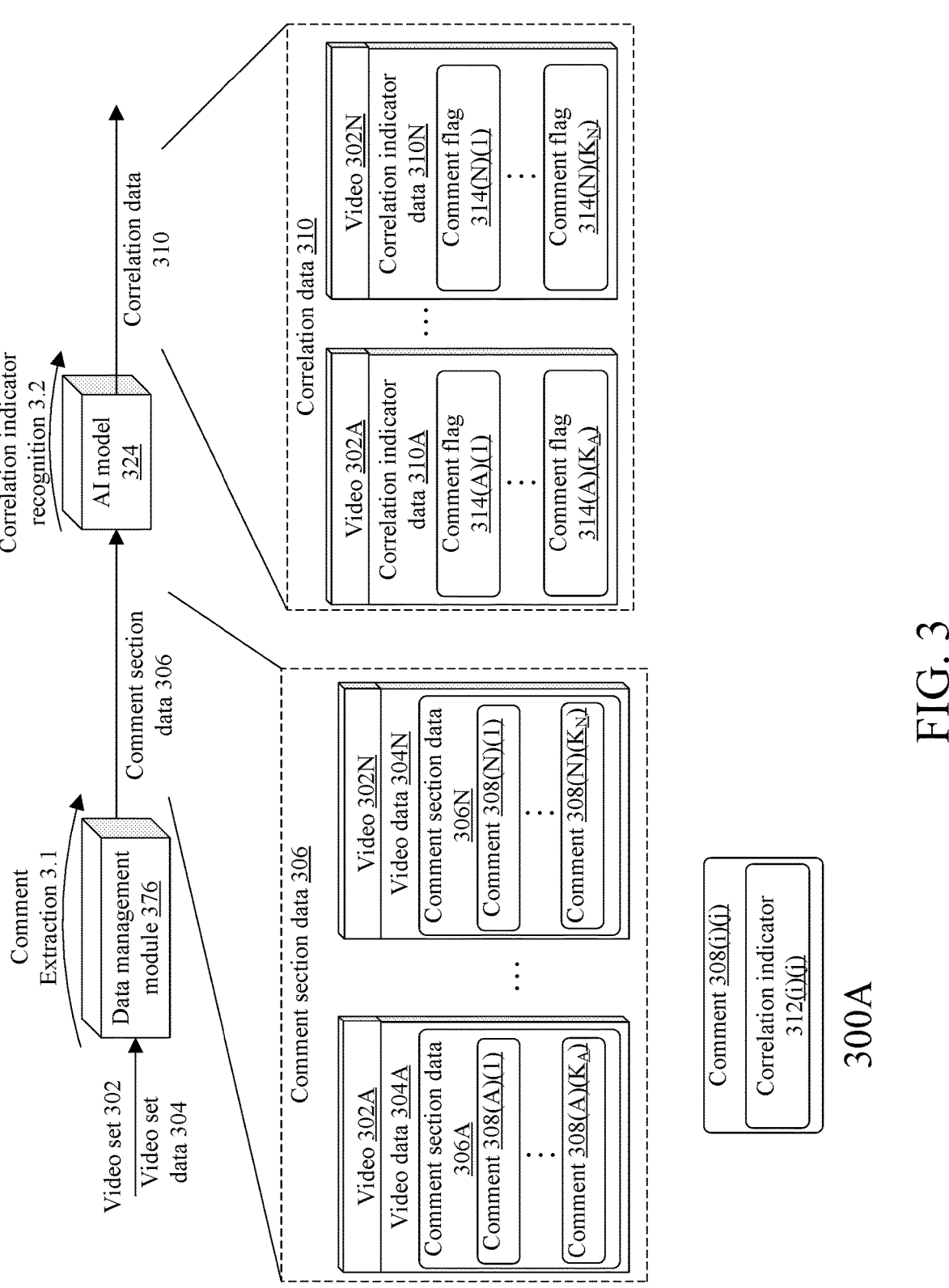
FIG. 3 illustrates comment extraction and correlation indicator recognition subprocesses of the process of FIG. 2, in accordance with some embodiments of the present disclosure.

FIG. 3 illustrates comment extraction and correlation indicator recognition subprocesses of the process of FIG. 2, in accordance with some embodiments of the present disclosure.

In some embodiments, similar features and components as were described within FIG. 2 may be used in FIG. 3. For example, comment extraction 3.1 may correspond, or be similar, to comment extraction 2.1 as seen and described in FIG. 2, and incorporate and augment at least the embodiments described therein. Correlation indicator recognition

3.2 may correspond, or be similar, to correlation indicator recognition 2.2 as seen and illustrated in FIG. 2, and incorporate and augment at least the embodiments described therein. Similarly, data management module 376, AI model 324, video set 302, comments section data 306, and correlation data 310 may correspond, or be similar, to data management module 276, AI model 224, video set 202, comments section data 206, and correlation data 210 as seen and described in FIG. 2, and incorporate and augment at least the embodiments described therein. In some embodiments, videos 302A-N, video data 304A-N, comments section data 306A-N, comments within comments section data 306A-N, and correlation indicators within comments within comments section data 306A-N may be similar to example video 202($i$), example video data 204($i$), example comments section data 206($i$), example comments 208($i$)(1–K$_i$), and example correlation indicators 212($i$)(1) and 212($i$)(K$_i$) as were seen and described in FIG. 2, and incorporate and augment at least the embodiments described therein.

As described with respect to FIG. 2, comment extraction operation 3.1 may intake a video set 302 indicating videos 302A-N. In some embodiments, the data management module 376 may access the video data 304A-N associated with videos 302A-N, and extract the comments section data 306 that may be associated with the comments section for each video. In some embodiments, the video set 302 indicating videos 302A-N may be provided by a client device, a user, or some other module or platform of system 100 (as was described with respect to FIG. 1) for processing.

In some embodiments, the set, or group of videos 302 may be identified, or provided, along with associated video data 304A-N. In other embodiments, the data management module 376 may fetch the data associated with each video 302A-N from an appropriate storage location or device.

After accessing the data 304A-N associated with each video, video data 304A-N may be processed to extract comments section data 306 (including data 306A-N) from each video. For example, in some embodiments, the video data 304A-N may include considerable, or large, amounts of data that will not be used. Such data can include video content data, metadata, audio data, etc. Operation 3.1 may sift through the data associated with each video, identify the data associated with the comments section of the video, and extract comments for further processing.

In some embodiments, each distinct unit of comments section data 306A-N (e.g., comment data 306A, comment data 306B, etc.), may correspond to the comments section of a unique video. For example, comment data 306A may include all the comments within the comments section of video 302A, comment data 306B may include all the comments within the comments section of video 302B, and so on and so forth.

As discussed with respect to FIG. 2, the number of comments within in each comments section may vary. In some embodiments, the total number of comments within a comments section i may be denoted by $K_i$. For example, with reference to a video 302A of videos 302A-N, comments section data 306A may include all of the comments within the comments section for that video. Thus, comments section data 306A may include comments 308(A)(1)-308(A) (K$_A$). Comment section data 306B may include comments 308(B)(1)-308(B)(K$_B$), and so on and so forth.

In some embodiments, the comments section data for a comments section of a video may include many comments, and $K_i$ may be very large (i.e., include hundreds of comments, or more). In other embodiments, a video comments section may include a small number of comments. Thus, each unit of comment data 306A-N may vary in length, and each unit may hold any number of associated comments.

As seen in example comment data structure 300A, an example comment 308($i$)($j$) may include a correlation indicator 312($i$)($j$). Example comment 308($i$)($j$) may be exemplary of any of the comments within comments section data 306. As was similarly discussed with respect to FIG. 2, a comment of comments section data 306 may, or may not, include a correlation indicator. Although not shown in comments section data 306A-N, any of the corresponding comments may include a correlation indicator indicating that a user who has generated the comment has associated the respective video with a sentiment.

As discussed in relation to FIG. 2, in some embodiments, after comment data 306 has been extracted, the AI model 324 may perform correlation indicator recognition at operation 3.2. At operation 3.2, AI model 324 can intake comments section data 306, as described above, and generate correlation data 310. As described above, a single comment may, or may not, contain a correlation indicator, and AI model 324 may process each comment within data 306, to generate flags, or meta-indicators, indicating whether a comment associated with a particular video includes a correlation indicator.

As discussed above, and further seen in FIG. 3, in some embodiments, AI model 324 may generate a single flag, or meta-indicator, for each comment within comments section data 306. For example, with reference to video 302A, the comment data 306A may include comments 308(A)(1)-308 (A)(K$_A$). Any number of these comments, ranging from none to all, may contain a correlation indicator. Thus, for video 302A, AI model 324 may generate comment flags 314(A)(1)-314(A)(K$_A$) corresponding to comments 308(A) (1)-308(A)(K$_A$). For video 302B, AI model 324 may generate comment flags 314(B)(1)-314(B)(K$_B$), and so on and so forth.

In some embodiments, a flag, or meta-indicator, produced by AI model 324 for a comment may indicate whether or not the comment includes a correlation indicator for a specific sentiment. In other embodiments, the comment flags may also indicate the level, or strength, of the relationship indicated by the correlation indicator. In some embodiments, correlation data may only include flags that indicate a comment includes a correlation indicator, and flags that indicate a comment does not include a correlation indicator may be discarded (e.g., by the AI model or any other system component). Thus, the specific contents of each comment flag may vary.

As discussed in relation to FIG. 2, in some embodiments, a correlation indicator may be a portion of the comment that implies a user who generated the comment found a correlation between the associated video and a specific sentiment. In some embodiments, a correlation indicator may be a set of words, a phrase, or a sentence. In other embodiments, a correlation indicator may be an emoji, or sequence of characters that correlates the video with a sentiment. Thus, a correlation indicator may be any portion of a comment commonly found within a comments section of a video.

AI model 324 may be pretrained to recognize the presence of a correlation indicator within a comment, for a specific sentiment. Such a training process will be further described with respect to FIG. 5. Correlation indicators within comments may be implicit, explicit, subtle, and at times, difficult to detect. A few non-limiting examples of correlation indicators within user comments will now be provided below.

For example, in some embodiments, AI model 324 may scan comments section data 306 for the specific sentiment of violence. For the purpose of this example, let us assume that video 302A contains scenes of violence, or violent behavior, while video 302B does not contain such scenes. Within comments section data 306A, there may be comments that indicate that video 302A contains violent scenes, while comments section data 306B may lack comments that indicate a correlation with violence. In some embodiments, the indication that the video contains violent scenes may be embedded in what is referred to as the correlation indicator.

For example, (continuing with the above example) certain comments within comments 308(A)(1)-308(A)(K_A) may include a correlation indicator indicate that the video contains violence. For example, a comment 308(A)(1), or any comment in comments section data 306A may be the comment: "Wow! That scene was so violent." In such case, the portion "that scene was so violent," may be an explicit correlation indicator, indicating that the associated video is correlated with the sentiment of violence. The portion "Wow!" of the comment may not be relevant to the correlation indicator, or analysis. A further comment associated with the video e.g., comment 308(A)(2), may be the comment "This video has too much violence!". In this case, the correlation indicator may be the entire comment. Thus, comments within the comments section data can include correlation indicators that associated the video with a given sentiment.

Continuing with the above example, not every comment within comments section data 306A may include a correlation indicator. For example, some comments may comment on other aspects of the video, or scenes. In some embodiments, comments of the video may reference other sentiments, that the AI model is not trained to recognize. Thus, only some comments of comments section data 306 may include correlation indicators.

The above examples illustrate explicit correlations, as they directly correlate the video with a specific sentiment (i.e., violence). In some embodiments, a comment may correlate a video with a specific sentiment in a less explicit manner.

For example, in some embodiments, AI model 324 may scan comments section data 306 for the specific sentiment of comedy. For the purpose of this example, let us assume that video 302A contains scenes of comedy, or a scene that incites laughter in many viewers. Some comments within comments 308(A)(1)-308(A)(K_A) may explicitly indicated that the scene contains humor. For example a comment 308(A)(1) may be the comment "OMG this video is soooo funny." The correlation indicator may be explicit. In other examples, the correlation indicator may be implicit. For example, a comment such as 308(A)(2) may be the comment "OMG, I'm dying!". Although the comment does not specifically reference comedy, or humor, the comment may imply a correlation with comedy, either through indirect language, slang, natural language, or any other form of implicit indication. Thus, the correlation indicator may be implicit, or more subtly included in the comment. In some embodiments AI model 324 may be trained to identify such implicit indicators, through phrases, or other comment components, and generate an appropriate flag.

As discussed in relation to FIG. 2, in some embodiments, AI model 324 may process each comment and may only recognize and generate flags for a specific sentiment. In such embodiments, operation 3.2, or the entire process, may be repeated with a second, third, or any number of additional AI models, to recognize correlation indicators for a wide variety of sentiments.

In some embodiments, AI model 324 may be capable of recognizing correlation indicators for more than one specific sentiment. In some embodiments, a single AI model may process each comment and may generate more than one flag for a single comment, corresponding to more than one sentiment.

As discussed in FIG. 2, in some embodiments, a comment flag of correlation data 310A-N may be binary indicator, i.e., a comment flag may indicate whether a comment includes a correlation indicator or not. In other embodiments, a comment flag may be fluid, or indicate a scale, that include the strength or level of association indicated by the comment for the video and a sentiment. Thus in some cases, the comment flags of correlation data 310 may be binary, or non-binary.

Figure 4:
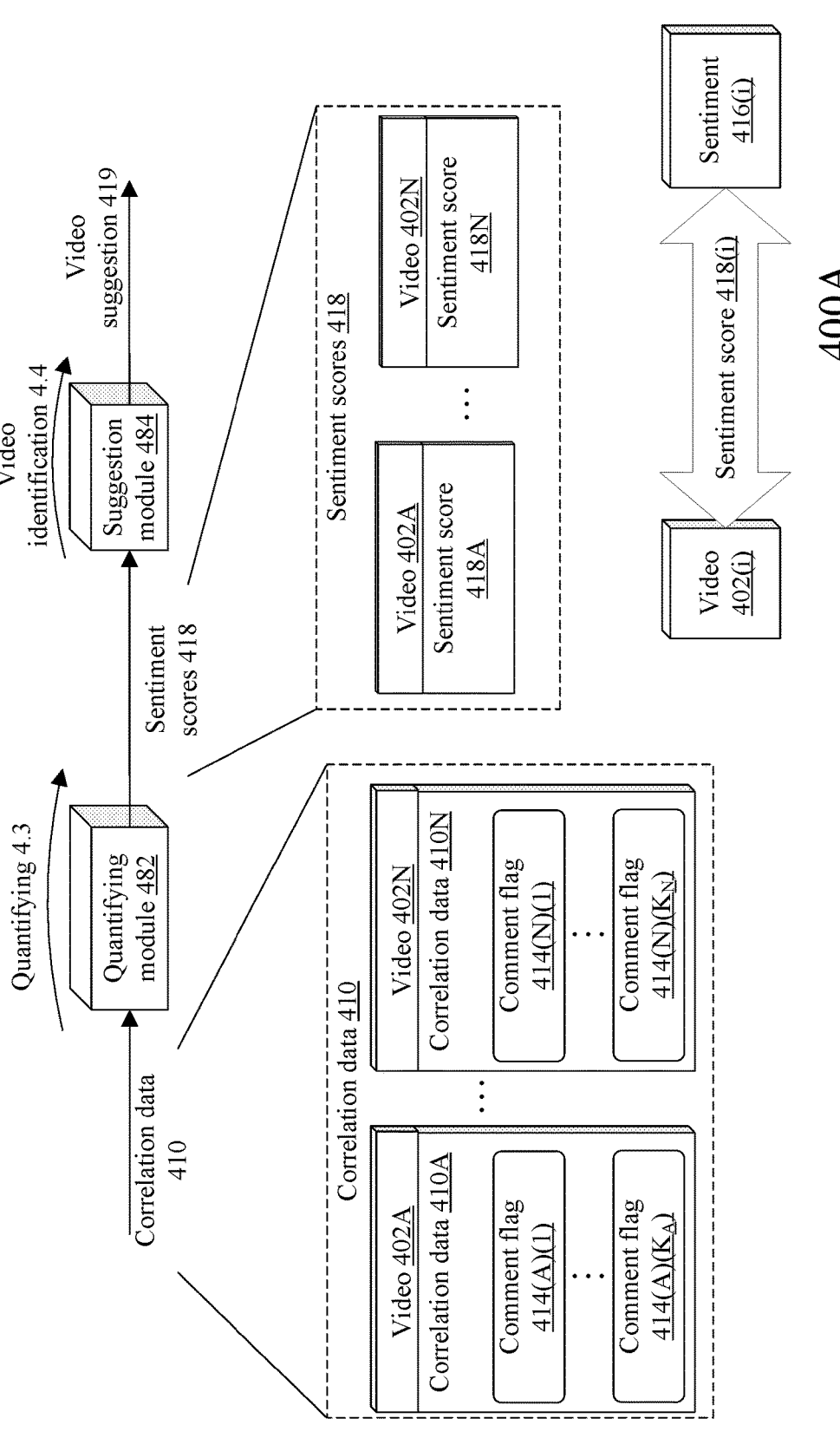
FIG. 4 illustrates quantifying and video identification subprocesses of the process of FIG. 2, in accordance with some embodiments of the present disclosure.

FIG. 4 illustrates quantifying and video identification subprocesses of the process of FIG. 2, in accordance with some embodiments of the present disclosure.

In some embodiments, similar features and components as were described within FIG. 2-3 may be used in FIG. 4. For example, quantifying 4.3 may correspond, or be similar, to quantifying 2.3 as seen and described in FIG. 2, and incorporate and augment at least the embodiments described therein. Video identification 4.4 may correspond, or be similar, to video identification 2.4 as seen and described in FIG. 2, and incorporate and augment at least the embodiments described therein. Similarly, correlation data 410, quantifying module 482, sentiment scores 418, suggestion module 484, and video suggestion 419 may correspond, or be similar, to correlation data 210 and 310, quantifying module 282, sentiment scores 218, suggestion module 284, and video suggestion 219 as seen and described in FIGS. 2-3, and incorporate and augment at least the embodiments described therein. In some embodiments, videos 402A-N may be similar to example video 202(*i*) and videos 302A-N, as were seen and described in FIGS. 2-3, and incorporate and augment at least the embodiments described therein.

As described with respect to FIG. 2, quantifying (seen at operation 4.3) may intake a correlation data 410 and output sentiment scores 418 (at times referred to as "sentiment intensity score(s)," or "intensity score(s)"). In some embodiments, a single sentiment score can be generated for each video 402A-N within the originally provided video set, for one (or more) sentiments. In some embodiments, sentiment scores may serve to quantify the intensity of a specific sentiment within a certain video, as indicated by the comment tags.

For example, in some embodiments, quantifying module may intake correlation data 410, compute the amount of comment flags that indicate a video is correlated with a given sentiment, and output an sentiment score for each video. For example, with reference to video 402A, quantifying module may process all associated comment flags 414(A)(1)-414(A)(K_A), to generate a corresponding sentiment score 418A. For video 402B, quantifying module may process all associated comment flags 414(B)(1)-414(B)(K_B), to generate a corresponding sentiment score 418B, and so on and so forth for other videos.

As discussed in FIG. 2, in some embodiments, to generate a sentiment score, quantifying module may simply add, or accumulate the comment flags indicating the video is associated with a given sentiment. In other embodiments, different, or more complex processes may be used.

For example, in a given embodiment, comment flags of correlation data 410A-N may be an indication of whether an associated comment indicated a correlation between the video and a given sentiment. With reference to video 402A, quantifying module may simply identify the number of comment flags within flags $414(A)(1)$-$414(A)(K_A)$ that indicate the associated comment indicated a correlated sentiment. For example, if correlation data 410A includes N comment flags with of M comment flags indicating a correlation of the respective comment with a sentiment, the quantifying module 482 may assign a sentiment score 418A of M to the corresponding video 402A. The process may continue so on and so forth for all videos within 402A-N. In such an embodiment, the sentiment score may quantify the amount of comments that indicated a correlation with a given sentiment for each video. Thus, an abstraction of the intensity, or strength of a video's association with a sentiment can be determined.

In other embodiments, more sophisticated algorithms may be used. For example, in some embodiments, an average may be taken. With reference to the example above, an average may be taken e.g., by dividing M by N, to determine a score ranging from 0 to 1, or a percentage from 0%-100%. In other embodiments, a weighted average can be taken, and so on and so forth. One of ordinary skill in the art will appreciate that the above processes for producing sentiment scores are exemplary and non-exhaustive, and that many different processes e.g., averages, weighted averages, summations, etc. may be used to compute a sentiment score for a video.

As illustrated by structure 400A, a sentiment score $418(i)$ for a given video $402(i)$, may serve to quantify the strength of the association, or correlation with a given sentiment $416(i)$.

In some embodiments, correlation data may include data associating each comment with more than one sentiment. In such instances, quantifying 4.3 may produce more than one, including any number of, sentiment scores for each video.

As discussed in relation to FIG. 2, after quantifying 4.3, suggestion module 484 may form a video suggestion 419, at operation 4.4. As previously discussed, suggestion module 484 may align a video with a particularly high sentiment score, with a user preference. For example, should a user indicate a predilection for a genre or sentiment, the suggestion module may scan sentiment scores 418 to identify a suitable video for the user. In other embodiments, a video with general appeal, e.g., a video that scores highly for the sentiment of joy, comedy, happiness, etc. may be selected for suggestion to a user.

Thus, process 200 of FIG. 2, and associated subprocesses as described in conjunction with FIGS. 3-4 may gather video data, extract correlation indicators, analyze indicator data, and calculate sentiment scores, to generate a video suggestion for a user.

Figure 5:
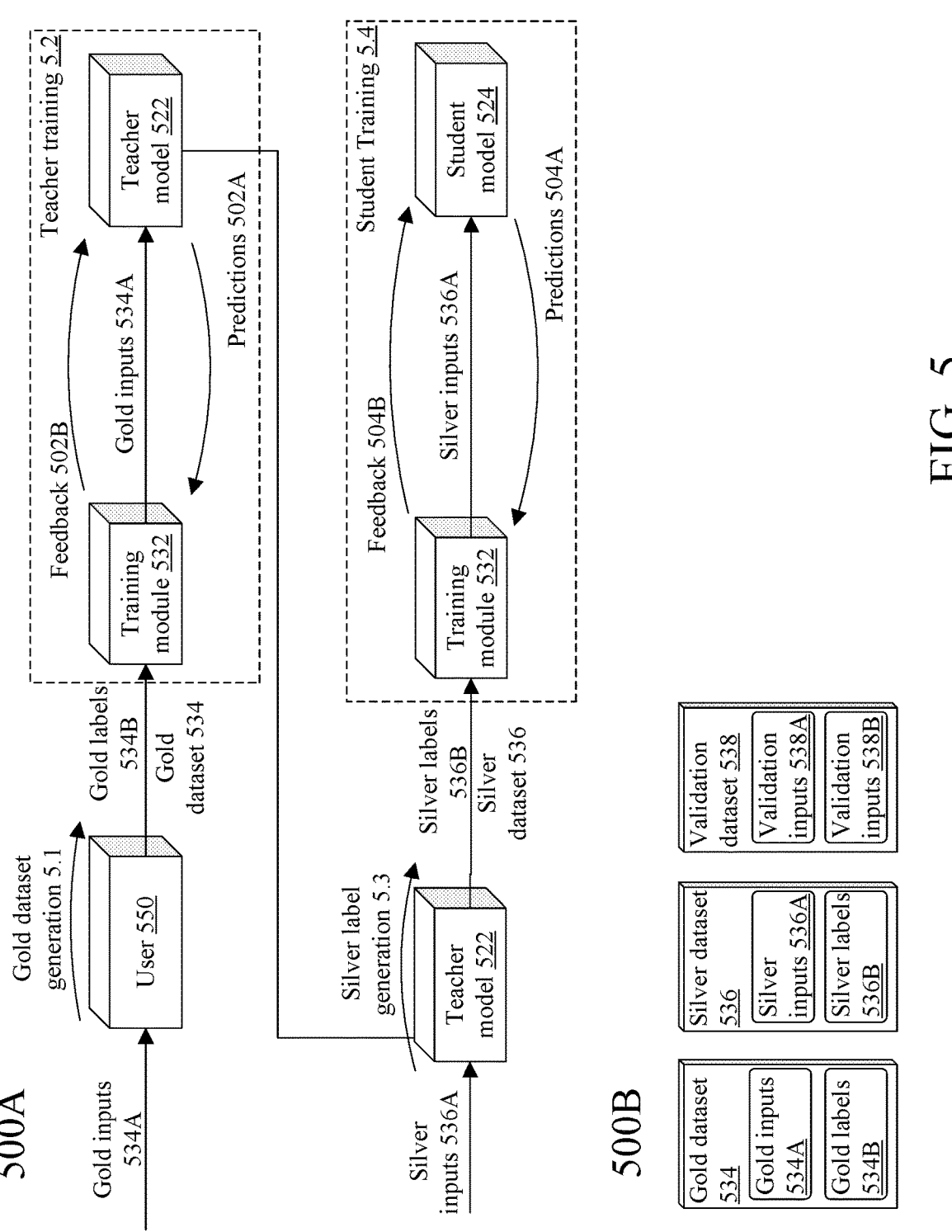
FIG. 5 illustrates an example process for generating an AI model of the suggestion engine of FIG. 1, in accordance with one embodiment of the present disclosure.

FIG. 5 illustrates an example process for generating a student AI model of the suggestion engine of FIG. 1, in accordance with one embodiment of the present disclosure.

In some embodiments, similar features and components as were described within FIGS. 1-4 may be seen in FIG. 5. For example, training module 532, teacher model 522, student model 524, gold dataset 534, silver dataset 536, and validation dataset 538 may correspond, or be similar, to training module 132, teacher AI model 122, student AI model 124, 224, or 324, gold dataset 134, silver dataset 136, and validation dataset 138 as seen and described in FIGS. 1-4, and incorporate and augment at least the embodiments described therein. As seen in data structures 500B, gold dataset 534 may include gold inputs 534A and gold labels 534B. Silver dataset 536 includes silver inputs 536A and silver labels 536B. Validation dataset 538 may include validation inputs 538A and validation labels 538B.

As discussed with respect to FIGS. 1-4, an AI model of the system (e.g., model 124, 224, 324) may be a student model 524, after it has been pre-trained through process 500A. In some embodiments, the student model may be pre-trained to correctly predict the silver labels from silver inputs 536A.

Within each dataset (e.g., silver dataset 536), the series of labels may correspond to a series of inputs. More specifically, a single label from the series of labels may correspond to a single input form the series of inputs. As discussed in more detail below, in some embodiments, the content of inputs and labels of each dataset may vary, according to multiple embodiments of process 500A, however, the overall sequence of subprocesses including dataset generations and trainings may remain the same across multiple embodiments. Possible contents of each dataset, inputs, and labels, will be discussed after the discussion of subprocess sequences.

In some embodiments, the system may use a teacher model, to train a student model to be used by the system. In some embodiments, a student model may be required by the system, due to the size, and processing time of the teacher model. For example, in some embodiments, the teacher model may be a large and complex AI model that has been extensively trained on vast and diverse datasets. Accordingly, the teacher model may possess broad knowledge and understanding of general textual and natural language concepts. The size and complexity of the teacher model may be too large and/or computationally intensive for deployment within the context of rapidly generating video suggestions. Thus, the student model may be a lightweight (e.g., smaller) and more compact AI model that may learn or "transfer" knowledge from the teacher model, while being more computationally efficient.

Process 500A for generating the trained student model may begin by generating a gold level dataset at gold dataset generation 5.1. Within operation 5.1, a user 550 (or developer) of the system may manually gather gold dataset 534. For example, the user may manually gather and provide both gold inputs and gold labels to training module 532. Since gold dataset 534 may be manually generated, in some embodiments, the gold dataset may include a small number of examples (e.g., videos and comments), e.g., 50-100 examples. In some embodiments, the gold dataset may include more (e.g., hundreds or more), of examples.

After the gold dataset generation at operation 5.1, teacher training 5.2 may take place. In some embodiments, a training module 532 may iteratively train teacher model 522 to generate or predict accurate gold labels corresponding to the gold inputs.

In some embodiments, teacher model 522 may be a pre-existing, or pre-trained large language model. In some embodiments, the teacher model may have already been pre-trained on a large corpus of textual data (prior to training 5.2). Such a corpus of textual data may include internet texts, books, articles, etc., which may have been used to provide the teacher model with a broad understanding of language, context, and general world knowledge. Thus, the teacher model may already be equipped to intake and/or understand foundational language structures and patterns.

For example, in some cases, the teacher model may be, or include, one or more of pre-existing large language models. For example, in some embodiments, teacher model 522 may be GPT (Generative Pre-trained Transformer) series of large language models (LLMs), Google's Bard®, or LaMDA or any other commonly accessible or proprietary AI model similar to the above-mentioned models.

In some embodiments, the teacher model may be fine-tuned using the gold dataset. In other embodiments, the gold dataset may only be provided as context to the teacher model.

In some embodiments, the training module 532 may iteratively provide feedback 502B to the predictions 502A generated by teacher model 522 from gold inputs 534A. Training module 532 may train teacher model 522 by iteratively adjusting weights and/or parameters of the teacher model. Such a training process may deploy a loss function, optimization function, and iterative weight and/or parameter adjusting, is well known in the art. As such, a suitable iterative training process for an LLM may be employed.

In other embodiments of teacher training 5.2, the user may provide the gold inputs and labels directly to teacher model 522. In such cases, the user may indicate the pairings of the inputs and labels and provide feedback 502B to the teacher model for training. In such cases, the weights and/or parameters of the teacher model 522 may not be adjusted, and the teacher model 522 may utilize the gold dataset 534 in a contextual manner.

In both embodiments, a continuous feedback loop may continue until a certain level of accuracy is reached by the prediction of teacher model 522. For example, in some embodiments, the model 522 may be tested on a validation dataset 538, to ensure accuracy level are sufficient to continue with process 500A. In some embodiments, teacher model 522 may be trained until an accuracy score of at least 50%, 60%, 70%, 75%, or more is reached by the model. Then the process 500A may continue.

After the teacher model has finished training, the teacher model may be used to generate silver labels, 536B, using silver inputs 536A to generate a silver dataset 536. In some embodiments, the teacher model may generate silver labels from silver inputs that are real world examples. In other embodiments, the teacher model may generate, or synthesize, both silver labels and silver inputs. In some embodiments, a combination of real world and synthesized examples may be used for silver inputs. Similar to real world examples, synthesized inputs may include comments that both do, and do not, include correlation indicators for a given sentiment. As mentioned above, the particular content of silver inputs and labels will be discussed below. Both the gold datasets and silver datasets may include data associated with generating a sentiment score for a displayable video of the video streaming platform.

In some embodiments, silver inputs 536A and the silver dataset may include a much larger collection of data associated with a video, and the teacher model may be used to generate the labels. In some embodiments, since the silver labels may be machine-generated outputs, the quantity or size of silver dataset may vastly surpass the quantity or size of the manually generated gold dataset. Furthermore, in some embodiments, gold dataset may include 100% accurate labels (since they are user-generated) for refining teacher model 522. The silver labels 536B, being machine-generated, may not always uphold the same quality standards as the gold labels. However, silver label generation may be much more scalable and efficient, as teacher model 522 may be able to rapidly produce sufficiently accurate labels.

After the larger silver dataset has been created, the training module 532 may use the silver dataset to train a student model 524 at student training 5.4. In a similar manner as discussed above with respect to teacher training 5.2, training module 532 may iteratively train student model 524 using silver dataset 536, by providing feedback 504B to predictions 504A, until sufficient level of accuracy is met with the student model. As disclosed previously, training module 532 may train student model 524 by iteratively adjusting weights and/or parameters of the student model. Such a training process may deploy a loss function, optimization function, and iterative weight and/or parameter adjusting, is well known in the art. A suitable iterative training process for an LLM may be employed.

In some embodiments, student model 524 may be trained until an accuracy score of at least 50%, 60%, 70%, 75%, or more is reached by the model. Once such an accuracy score is reached, the model can be deployed in any of the processes corresponding to the system (e.g., the processes discussed with respect to FIGS. 1-4).

In some embodiments, the contents of each dataset may correspond to different training processes, to produce different types, of pre-trained student model 524. Accordingly, the content of inputs and labels of the included datasets may vary as well.

For example, in some embodiments, the student model 524 may be pre-trained to generate comment labels (e.g., flags) for a specific comment. In such cases, a user of the system may provide a gold dataset including gold inputs that correspond to video comments, and gold labels that correspond to flags, or meta-indicators of whether the comment indicates the associated video is correlated with a sentiment. In such cases, the silver dataset may similarly include silver inputs that are video comments, and silver labels may similarly be flags or meta-indicators of whether an associated comment indicates the associated video is correlated with a sentiment.

As previously discussed, in some embodiments, the labels may be binary indicators that indicate whether a corresponding comment input includes a correlation indicator. In other embodiments, the labels may include a non-binary score, or a number, indicating the strength or level of the indicated correlation.

Thus, in such embodiments, student model 524 may be trained to predict flags, or meta-indicators, that indicated whether a given comment indicates a correlation between the associated video and a sentiment. As discussed above, the student model may be trained to produce flags, or meta-indicators, for a single sentiment, and process 500A may be repeated to produce one or more student models capable of producing flags, or meta-indicators, for several sentiments.

In some embodiments of the above embodiment of student model 524 and process 500A, the second, student model may be avoided altogether, and the teacher model 522 may be substituted for the student model 524. Since the teacher model is capable of generating comment flags, or meta-indicators, as well (albeit with a slower processing time), the teacher model may be directly substituted for the student model. Such a strategy may be employed in process 200A and subprocesses as described within FIGS. 2-4, including and augmenting the embodiments described therein.

In other embodiments, student model 524 may be pre-trained to produce sentiment scores for a particular video, directly from comment data associated with the video. In such cases, the gold dataset may be the same as above. For example, a user of the system may provide a gold dataset including gold inputs that correspond to video comments, and gold labels that correspond to flags, or meta-indicators of whether the comment indicates the associated video is correlated with a sentiment. However, in such cases, silver inputs may include batches of comments associated with a single video, and silver label generation 5.3 may include an additional step to generate a sentiment score for each batch of comments. Thus, silver labels may be the sentiment score corresponding to each batch of comments and an associated video. Silver inputs may be the batch of comments.

In such embodiments, the silver labels may be generated involving similar processes as described with respect to subprocesses 2.2 (or 3.2) and 2.3 (or 4.3) a seen in FIGS. 2-4. In some embodiments, the teacher model may first be used to generate corresponding flags, or meta-indicators, for each comment within the batches of comments of silver inputs. Then a quantifying module (e.g., such as quantifying module 182, 282, or 482, as discussed with respect to FIGS. 1-4, and incorporating the embodiments described therein) may be used to generate sentiment scores, for each batch of comments. These comment batches and sentiment score pairs may then be used to train student model 524.

Thus, in such embodiments, student model 524 may be trained to produce sentiment scores for a particular video, directly from comment data associated with the video, and forego any outward flags, meta-indicators, or correlation indicators. As previously discussed, the student model may be trained to produce sentiment scores for a single sentiment, and process 500A may be repeated to produce one or more student models capable of sentiment scores for several sentiments.

In some embodiments, student model 524 may be trained to predict sentiment scores directly from video content data, such as raw video data, or extract video features. In such cases, the gold dataset may be the same as above. For example, a user of the system may provide a gold dataset including gold inputs that correspond to video comments, and gold labels that correspond to flags, or meta-indicators of whether the comment indicates the associated video is correlated with a sentiment. In such cases, operation 5.3 may proceed in the similar manner as above, where silver inputs may include batches of comments associated with a single video, and silver label generation 5.3 may include an additional step to generate a sentiment score for each batch of comments. However, after the sentiment score is generated as a silver label for each batch of comments, the batch of comments may be replaced with the video content data. Thus, silver labels may be the sentiment score corresponding to each batch of comments for an associated video, and silver inputs may be the video content data associated with the video.

In such embodiments, the video content data for the silver inputs may simply be accessed or fetched, by the training module 532, or a separate module. In other embodiments, the video content data for the silver inputs may first undergo feature extraction, using a separate feature extractor (not shown in FIG. 5). Such a feature extractor may be any commonly deployed type or version of feature extractors, as one of ordinary skill in the art will be able to identify and deploy.

The video content data and sentiment score pairs may then be used to train student model 524.

Thus, in such embodiments, student model 524 may be trained to produce sentiment scores for a particular video, directly from video content data, such as raw video data, or extract video features. Thus, student model 524 may forego any outward flags, meta-indicators, correlation indicators, comments, or comments section data. As previously discussed, the student model may be trained to produce sentiment scores for a single sentiment, and process 500A may be repeated to produce one or more student models capable of sentiment scores for several sentiments.

Regardless of the type of student model to be trained, the comment data used by gold dataset may be comment data sourced from real comment data sources. Each comment within the comment data may be associated with a real video of a video streaming platform. In some embodiments, the comment data and inputs within a dataset may thus be or include natural language data, including textual data, phrases, slang, colloquial language, numerical values, sequences, etc., or any other similar data commonly found within an online video comment.

In some embodiments, the gold dataset may correspond to a single sentiment. For example, a group of comments may be selected by the user, and then labels may be provided by the user which indicated whether the comment indicates a given sentiment. For example, in the case of a comedic sentiment, a label of the labels may be a simple "yes" or "no", indicating whether a given comment indicates an associated video is correlated with the comedic sentiment.

FIG. 6 illustrates an example user interface (UI) for the system of FIG. 1, in accordance with some embodiments of the present disclosure.

Example UI 600 may be provided by one or more processing devices of the system (e.g., video streaming platform 170 as seen in FIG. 1, may host UI 600). In some embodiments, UI 600 may be provided to, and/or for presentation, at a client device (e.g., client device 150 of FIG. 1). In some embodiments, UI 600 may correspond, or be similar, to UI 154 as illustrated in FIG. 1, and incorporate and augment at least the embodiments described therein.

As illustrated in FIG. 6, UI 600 can include one or more visual elements. As disclosed in relation to FIG. 1, a visual element may refer to a UI element that occupies a particular region in the UI. Such visual elements can include one or more windows (e.g. video windows which may display the video streams or data streams hosted a video streaming platform), chat boxes (e.g. chat boxes for a user to input textual information), informational displays (such as viewer counts, comments sections, etc.) as well as input elements (such as buttons, sliders, drop-down menus, etc., for a user to input data), or any other kind of visual element commonly associated with a UI. Such visual elements can be arranged or divided into specific regions of the UI. The UI may also present to the user interactive elements like buttons and sliders for controlling various aspects of the video conference. For instance, a video progress bar, buttons for muting/ unmuting audio of a video, adjusting audio volume, switching video layouts, and other actions may be included within UI 600.

In some embodiments, UI 600 can include a main region (e.g. main region 620) to display a primary video for user viewing. Multiple subregions can hold other elements, such as the subregion 630 below the main region 620, which may hold a comments section associated with the video, or the side region 650 on the right side of the UI, which may hold a series of suggest videos for the viewer. Thus, an example UI of the system can display multiple regions. It should be understood that numerous other layouts and configurations for UI 600 may exist, and that UI 600 as seen is an example representation of a UI associated with the system.

As discussed above, the UI can include a subregion 630 that may include a comments section associated with a video that may be playing within main region 620. As seen in FIG. 6, the comments section may include various comment from various users. For example comments 632, 634, and 636 within a comments section may each be generated by a different user, as indicated by comment metadata 638, 640, and 642. Each comment may include data (e.g., textual data), and be associated with a specific video and video content.

In some embodiments, the UI may include a textual entry space (not seen in FIG. 6) for a user to input their own comment, to be associated with the video within region 620. Thus, the comments section may be user-generated, and evolve and grow as more and more users view and comment on the video.

As discussed above, the UI can include a side region 650, for presenting and/or suggesting one or more videos to a user of the system for viewing. In some embodiments, more than one video may be presented, such as videos 652, 654, and 656. In some embodiments, any number of videos as can reasonably fit within such a space and UI may be presented to a user as suggested videos for viewing. In some embodiments, a thumbnail pertaining to the suggested video may be presented.

In some embodiments, suggested videos 652, 654, and/or 656 may correspond, or be similar, to video suggestion 219 and/or 419 as seen and described in FIGS. 2 and 4, and incorporate and augment at least the embodiments described therein. In some embodiments, suggested videos 652, 654, and/or 656 may be generated through process 200 and associated subprocess, as seen and described in FIGS. 2-5, and incorporate and augment at least the embodiments described therein.

In some embodiments, the UI, may not be associated with a single video, and instead may be associated with the video streaming platform at large. Such may be the case at a "home page" of the video streaming platform, or any embodiments of the video streaming platform where multiple videos are displayed and searchable. Such a home page may continue to include a space for video suggestions.

Figure 7:
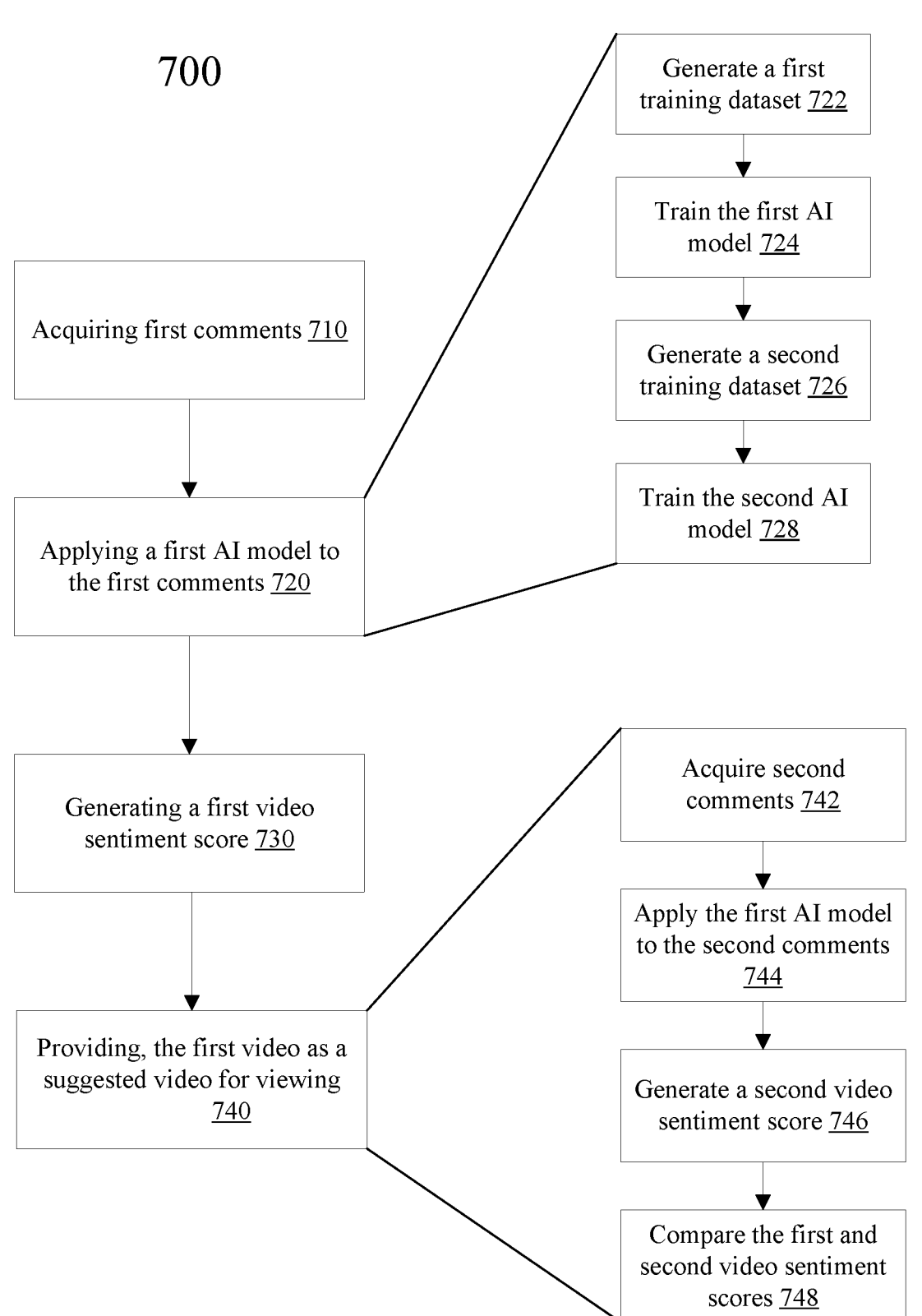
FIG. 7 is a flow diagram of an example method of generating a video suggestion, in accordance with some embodiments of the present disclosure.

FIG. 7 illustrates a flow diagram of an example method for suggesting a video for viewing to a user of a video streaming platform, in accordance with some embodiments of the present disclosure.

Method 700 may be performed by a processing device that may include hardware, software, or a combination of both. The processing device may include one or more central processing units (CPUs), graphics processing units (GPUs), field-programmable gate arrays (FPGAs), application-specific integrated circuits (ASICs), or the like, or any combination thereof. In one embodiment, method 700 may be performed by the video suggestion engine 180 and the associated algorithms, e.g., as described in conjunction with FIGS. 1-5. In certain embodiments, method 700 may be performed by a single processing thread. Alternatively, method 700 may be performed by two or more processing threads, each thread executing one or more individual functions, routines, subroutines, or operations of the method. In an illustrative example, the processing threads implementing method 700 may be synchronized (e.g., using semaphores, critical sections, and/or other thread synchronization mechanisms). Alternatively, the processing threads implementing method 700 may be executed asynchronously with respect to each other. Therefore, while FIG. 7 and the associated descriptions list the operations of method 700 in a certain order, in some embodiments, at least some of the described operations may be performed in parallel and/or in a different order, in some embodiments. In some embodiments one or more operations of method 700 is not performed.

At block 710, method 700 may include acquiring first comments. In some embodiments, processing logic may acquire first comments from a first comments section associated with a first video.

At block 720, method 700 may include applying a first AI model to the first comments. In some embodiments, the processing logic performing method 700 may apply a first artificial intelligence (AI) model to the first comments to identify one or more first sentiment correlation indicators indicating a correlation between the first video and a sentiment.

As illustrated with callout block 722, the processing device performing method 700 may generate a first training dataset. In some embodiments, processing logic may generate the first training dataset.

As illustrated with callout block 724, the processing device performing method 700 may train the first AI model. In some embodiments, processing logic may train the first AI model using the first training dataset.

As illustrated with callout block 726, the processing device performing method 700 may generate a second training dataset. In some embodiments, processing logic may generate the second training dataset.

As illustrated with callout block 728, the processing device performing method 700 may train the second AI model. In some embodiments, processing logic may train the second AI model using the second training dataset.

At block 730, method 700 may include generating a first video sentiment score. In some embodiments, processing logic may generate, using the one or more first sentiment correlation indicators, a first video sentiment score quantifying the correlation between the first video and the sentiment.

At block 740, method 700 may include providing the first video as a suggested video for viewing. In some embodiments, processing logic may provide, using the first video sentiment score, the first video as a suggested video for viewing to the user of the video streaming platform.

As illustrated with callout block 742, the processing device performing method 700 may acquire second comments. In some embodiments, processing logic may acquire second comments from a second comments section associated with a second video.

As illustrated with callout block 744, the processing device performing method 700 may apply the first AI model to the second comments. In some embodiments, processing logic may apply the first AI model to the second comments to identify one or more second sentiment correlation indicators indicating a correlation between the second video and the sentiment.

As illustrated with callout block 746, the processing device performing method 700 may generate a second video sentiment score. In some embodiments, processing logic may generate, using the one or more identified second sentiment correlation indicators, a second video sentiment score quantifying the correlation between the second video and the sentiment.

As illustrated with callout block 748, the processing device performing method 700 may compare the first and second video sentiment scores. In some embodiments, processing logic may provide the first video as a suggested video for viewing to the user of the video streaming platform, responsive to a comparison between the first video sentiment score and the second video sentiment score.

Figure 8:
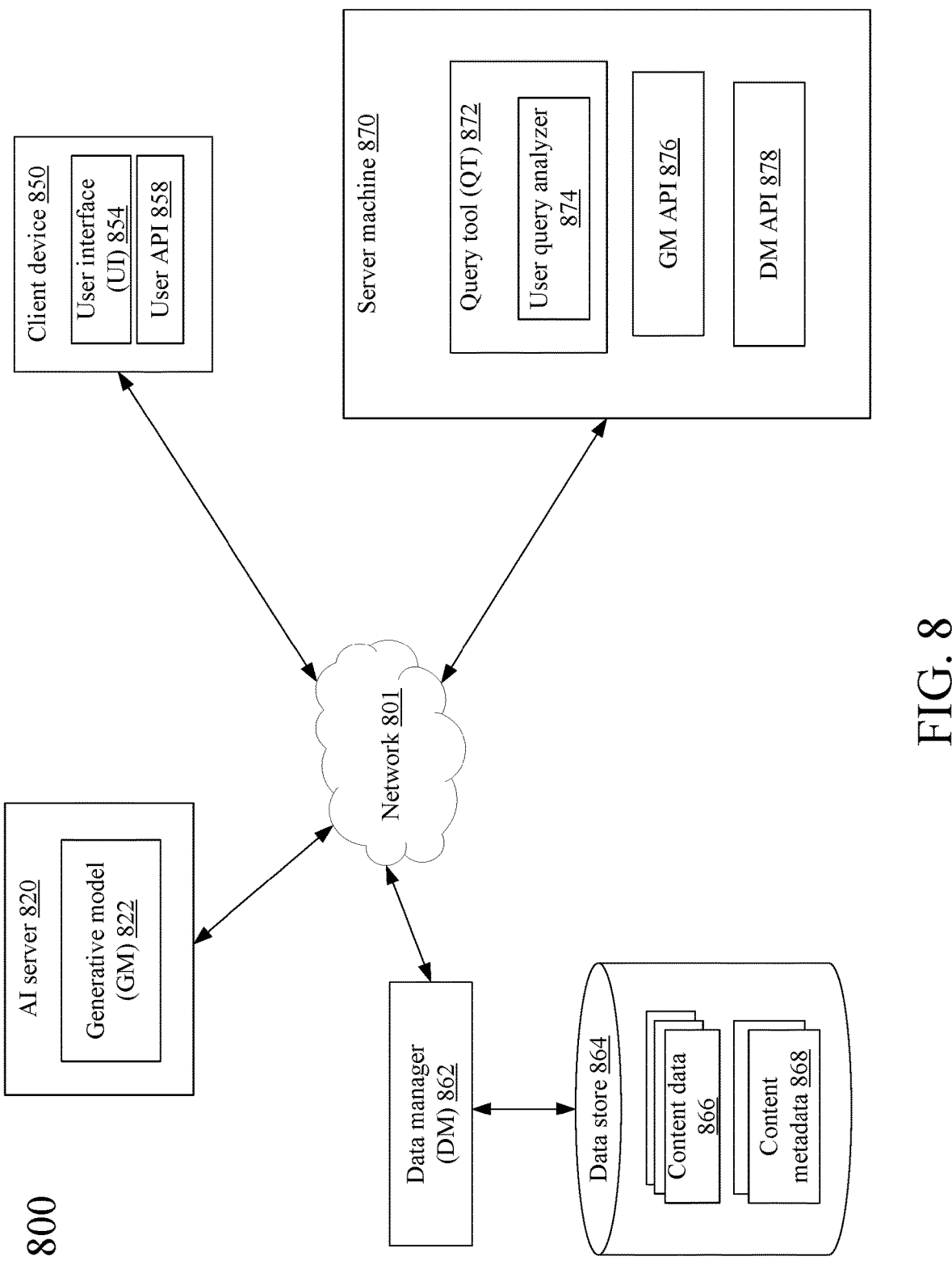
FIG. 8 illustrates a high-level component diagram of an example system architecture for a generative machine learning model, in accordance with one or more embodiments of the present disclosure.

FIG. 8 illustrates a high-level component diagram of an example system architecture 800 for a generative machine learning model, in accordance with one or more aspects of the disclosure. The system architecture 800 (also referred to as "system" herein) includes a data store 864, a generative model 822 provided by AI server 820, a server machine 870 with a query tool (QT) 872, one or more client devices 850, and/or other components connected to a network 8801.

In some embodiments, client devices 850 may be similar, or correspond, to client devices (e.g., device 150) of FIG. 1, and incorporate and augment at least the embodiments described therein. In some embodiments, user interface (UI) 854, may be similar, or correspond, to user interface (UI) 154 and/or UI 600 of FIGS. 1 and 6, and incorporate and augment at least the embodiments described therein. In some embodiments, network 501 may be similar, or correspond, to network 101 of FIG. 1, and incorporate and augment at least the embodiments described therein. In some embodiments, AI server 820 and generative model 822 may be similar, or correspond, to AI model platform 120 and AI model 124, 224, 324, or 524 of FIGS. 1-5, and incorporate and augment at least the embodiments described therein. In some embodiments, server machine 870, may be similar, or correspond, to video streaming platform 170 of FIG. 1, and incorporate and augment at least the embodiments described therein. In some embodiments, data store 864, may be similar, or correspond, to storage device 164 of FIG. 1, and incorporate and augment at least the embodiments described therein.

In some embodiments, network 801 may be a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), and/or the like. In some embodiments, network 801 may include routers, hubs, switches, server computers, and/or a combination thereof.

In some embodiments, any of AI server 820, server machine 870, data store 864 and/or client device(s) 850 may include a desktop computer, a laptop computer, a smartphone, a tablet computer, a server, a scanner, or any suitable computing device capable of performing the techniques described herein.

The system architecture 800 (also referred to as "system" herein) includes an AI server 820 including a generative model (GM) 822 (also referred to herein as a generative AI model). A generative AI model can include an AI model that is trained to generate new, original data based on given inputs. GM 822 can be trained according based on a corpus of data, as described herein.

A generative AI model can deviate from a machine learning model based on the generative AI model's ability to generate new, original data, rather than making predictions based on existing data patterns. As described above, a generative AI model can include a generative adversarial network (GAN) and/or a variational autoencoder (VAE). In some instances, a GAN, a VAE, and/or other types of generative AI models can employ a different approach to training and/or learning the underlying probability distribution of training data, compared to some machine learning models. For instance, a GAN can include a generator network and a discriminator network. The generator network attempts to produce synthetic data samples that are indistinguishable from real data, while the discriminator network seeks to correctly classify between real and fake samples. Through this iterative adversarial process, the generator network can gradually improve its ability to generate increasingly realistic and diverse data.

Generative AI models also have the ability to capture and learn complex, high-dimensional structures of data. One aim of generative AI models is to model underlying data distribution, allowing them to generate new data points that possess the same characteristics as training data. Some machine learning models (e.g., that are not generative AI models) focus on optimizing specific prediction of tasks.

With respect to GM 822, GM 822 can be trained by AI server 820 (or another server or computing device of system 800), in some embodiments. In an illustrative example, a training set generator (not shown) of AI server 820 can initialize a training set T to null (e.g., { }). The training set generator can identify comment data from an online video streaming platform and a determination of whether the comment data indicates a correlated sentiment. In some embodiments, the determination of whether the comment data indicates a correlated sentiment may be provided by a user. In other embodiments, the training set generator can determine whether the comment indicates a correlated sentiment.

The training set generator can generate an input/output mapping, in some embodiments. The input can be based on the identified data that includes the comment data and the outputs can indicate whether the comment data includes an indication of a correlated sentiment (e.g., in accordance with the determination by the training set generator). In some embodiments, the input/output mappings may correspond, or be similar, to any of the inputs and labels described with respect to FIG. 5, and incorporate and augment at least the embodiments described therein.

The training set generator can add the input/output mapping to the training set T and can determine whether training set T is sufficient for training GM 822. Training set T can be sufficient for training GM 822 if training set T includes a threshold amount of input/output mappings, in some embodiments. In response to determining that training set T is not sufficient for training, the training set generator can identify additional data that indicates additional and generate additional input/output mappings based on the additional data. In response to determining that training set T is sufficient for training, the training set generator can provide training set T to GM 822. In some embodiments, the training set generator provides the training set T to a training engine.

As mentioned above, GM 822 can be trained to determine the context of a given input text through its ability to analyze and understand surrounding words, phrases, and patterns within the given input text. The training set generator can identify or otherwise obtain sentences (or parts of sentences) of phrases provided by users. The phrases can be included in content produced or retrieved from other sources of the Internet and/or any other database accessible by the training set generator and/or GM 822. The training set generator can generate an input/output mapping based on the obtained sentences (or parts of sentences). The input can include a portion of an obtained sentence of a phrase. Another portion of the obtained sentence or phrase is not included in the input. The output can include the complete sentence (or part of the sentence), which includes both the portion included in the input and the additional portion that is not included in the input. In accordance with embodiments of the present disclosure, the training set generated by the training set generator to train GM 822 can include a significantly large amount of input/output mappings (e.g., millions, billions, etc.). In some embodiments, multiple input/output mappings of the training set can correspond to the same sentence (or part of the sentence), where the input of each of the input/output mappings include a different portion of the sentence (or part of the sentence).

In some embodiments, the sentences used to generate the input/output mapping of the training set can be obtained from phrases included in electronic documents (e.g., collaborative electronic documents, web page documents, etc.). In such embodiments, the training set generator can determine a context of one or more portions of content of an electronic document. For example, the training set generator can provide a portion of content as input to another machine learning model that is trained to predict a context of the content. The training set generator can update an input/output mapping corresponding to the sentence included in the electronic document to include the determined context. In other or similar embodiments, the training set generator can update the input/output mapping for the sentence to include an indicator of the electronic document (e.g., a pointer or link to the document, a memory address or a web address for the electronic document).

A training engine (not shown) can train GM 822 using the training data (e.g., training set T) from the training set generator. In some embodiments, the training engine may correspond, or be similar, to training module 132 and/or 532 described with respect to FIGS. 1 and 5, and incorporate and augment at least the embodiments described therein. A validation engine (not shown) may be capable of validating a GM 822 using a corresponding set of features of a validation set from the training set generator. The validation engine may determine an accuracy of each of the trained GMs 822 based on the corresponding sets of features of the validation set. The validation engine may discard a trained GM 822 that has an accuracy that does not meet a threshold accuracy. In some embodiments, a selection engine not shown) may be capable of selecting a GM 822 that has an accuracy that meets a threshold accuracy. In some embodiments, the selection engine may be capable of selecting the trained GM 822 that has the highest accuracy of the trained GMs 822.

A testing engine (not shown) may be capable of testing a trained GM 822 using a corresponding set of features of a testing set from the training set generator. For example, a first trained GM 822 that was trained using a first set of features of the training set may be tested using the first set of features of the testing set. The testing engine may determine a trained GM 822 that has the highest accuracy of all the trained machine learning models based on the testing sets.

It should be noted that AI server 820 can train the GM 822 in accordance with embodiments described herein and/or in accordance with other techniques for training a large language model. For example, GM 822 may be trained on a large amount of data, including prediction of one or more missing words in a sentence, identification of whether two consecutive sentences are logically related to each other, generation of next texts based on prompts, etc.

In some embodiments, data store 864 (database, data warehouse, etc.) may store any suitable raw and/or processed data, e.g., content data 866. For example, content data 866 may include any communications content associated with subtitle text, including online video subtitle text, etc. Content data 866 may also include user's consent to store user's content data and/or use user's data in information exchanges with generative model (GM) 822. Data store 864 may further store content metadata 868.

System 800 may further include a data manager (DM) 862 that may be any application configured to manage data transport to and from data store 864, e.g., retrieval of data and/or storage of new data, indexing data, arranging data by user, time, type of activity to which the data is related, associating the data with keywords, and/or the like. DM 862 may collect data associated with various subtitle data locations, e.g., through community generated subtitle spaces, applications, internal tools, and/or the like. DM 862 may collect, transform, aggregate, and archive such data in data store 864. In some embodiments, DM 862 may support a suitable software that, with user's consent, resides on client device(s) 850 and tracks user activities. For example, the DM-supported software may capture user-generated content and convert the captured content into a format that can be used by various content destinations. In some embodiments, the DM-supported software may be a code snippet integrated into user's browsers/apps and/or websites visited by the user. Generating, tracking, and transmitting data may be facilitated by one or more libraries of DM 862. In some embodiments, data may be transmitted using messages in the JSON format. A message may include a user digital identifier, a timestamp, name and version of a library that generated the message, page path, user agent, operating system, settings. A message may further include various user traits, which should be broadly understood as any contextual data associated with user's activities and/or preferences. DM 862 may track different ways the same user DM 862 may facilitate data suppression/deletion in accordance with various data protection and consumer protection regulations. DM 862 may validate data, convert data into a target format, identify and eliminate duplicate data, and/or the like. DM 862 may aggregate data, e.g., identify and combine data associated with a given user in the user's profile (user's persona), and storing the user's profile on a single memory partition. DM 862 may scan multiple user's profiles to identify and group users that are related to the same organization, activity, interests, and/or the like. DM 862 may scan numerous user's actions and identify user's profiles associated with multiple uses of a particular resource (e.g., a virtual meeting). DM 862 may ensure reliable delivery of data from user profiles (user personas) to recipients of that data, e.g., by tracking and re-delivering (re-routing) data whose transmission failed.

Data store 864 may be implemented in a persistent storage capable of storing files as well as data structures to perform identification of data, in accordance with embodiments of the disclosure. Data store 864 may be hosted by one or more storage devices, such as main memory, magnetic or optical storage disks, tapes, or hard drives, network-attached storage (NAS), storage area network (SAN), and so forth. Although depicted as separate from the server machine 870, data store 864 may be part of server machine 870, and/or other devices. In some embodiments, data store 864 may be implemented on a network-attached file server, while in other embodiments data store 864 may be implemented on some other types of persistent storage, such as an object-oriented database, a relational database, and so forth, that may be hosted by a server machine 870 or one or more different machines coupled to server machine 870 via network 801.

Server machine 870 may include query tool (QT) 872 configured to perform automated identification and facilitate retrieval of relevant and timely contextual information for quick and accurate processing of user queries by generative model 822, as disclosed herein. It can be noted that a user's request for an operation pertaining to a video streaming platform or service can be formed into a query that uses QT 872 in some embodiments. Via network 801, QT 872 may be in communication with one or more client devices 850, AI server 820, and data store 864, e.g., via DM 862. Communications between QT 872 and AI server 820 may be facilitated by GM API 876. Communications between QT 872 and data store 864/DM 862 may be facilitated by DM API 878. Additionally, GM API 876 may translate various queries generated by QT 872 into unstructured natural-language format and, conversely, translate responses received from generative model 822 into any suitable form (including any structured proprietary format as may be used by QT 872). Similarly, DM API 878 may support instructions that may be used to communicate data requests to DM 862 and formats of data received from data store 864 via DM 862.

A user (e.g., participant, etc.) may interact with QT 872 via a user interface (UI) 854. UI 854 may support any suitable types of user inputs, e.g., content from one or more UI elements, speech inputs (captured by a microphone), text inputs (entered using a keyboard, touchscreen, or any pointing device), camera (e.g., for recognition of sign language), and/or the like, or any combination thereof. UI 854 may further support any suitable types of outputs, e.g., speech outputs (via one or more speaker), text, graphics, and/or sign language outputs (e.g., displayed via any suitable screen), file for a word editing application, and/or the like, or any combination thereof. In some embodiments, UI 854 may be a web-based UI (e.g., a web browser-supported interface), a mobile application-supported UI, or any combination thereof. UI 854 may include selectable items. In some embodiments, UI 854 may allow a user to select from multiple (e.g., specialized in particular knowledge areas) generative models 822. UI 854 may allow the user to provide consent for QT 872 and/or generative model 822 to access user data previously stored in data store 864 (and/or any other memory device), process and/or store new data received from the user, and the like. UI 854 may allow the user to withhold consent to provide access to user data to QT 872 and/or generative model 822. In some embodiments, user inputs entered via UI 854 may be communicated to QT 872 via a user API 858. In some embodiments, UI 854 and user API 858 may be located on client device 850 that the user is using. For example, an API package with user API 858 and/or user interface 854 may be downloaded to client device 850. The downloaded API package may be used to install user API 858 and/or user interface 854 to enable the user to have two-way communication with QT 872.

QT 872 may include a user query analyzer 874 to support various operations of this disclosure. For example, user query analyzer 874 may receive a user input, e.g., user query, and generate one or more intermediate queries to generative model 822 to determine what type of user data GM 822 might need to successfully respond to user input. Upon receiving a response from GM 822, user query analyzer 874 may analyze the response, form a request for relevant contextual data for DM 862, which may then supply such data. User query analyzer 874 may then generate a final query to GM 822 that includes the original user query and the contextual data received from DM 862. In some embodiments, user query analyzer 874 may itself include a lightweight generative model that may process the intermediate query (ies) and determine what type of contextual data may have to be provided to GM 822 together with the original user query to ensure a meaningful response from GM 822.

QT 872 may include (or may have access to) instructions stored on one or more tangible, machine-readable storage media of server machine 870 and executable by one or more processing devices of server machine 870. In one embodiment, QT 872 may be implemented on a single machine. In some embodiments, QT 872 may be a combination of a client component and a server component. In some embodiments QT 872 may be executed entirely on the client device(s) 850. Alternatively, some portion of QT 872 may be executed on a client computing device while another portion of QT 872 may be executed on server machine 870.

Figure 9:
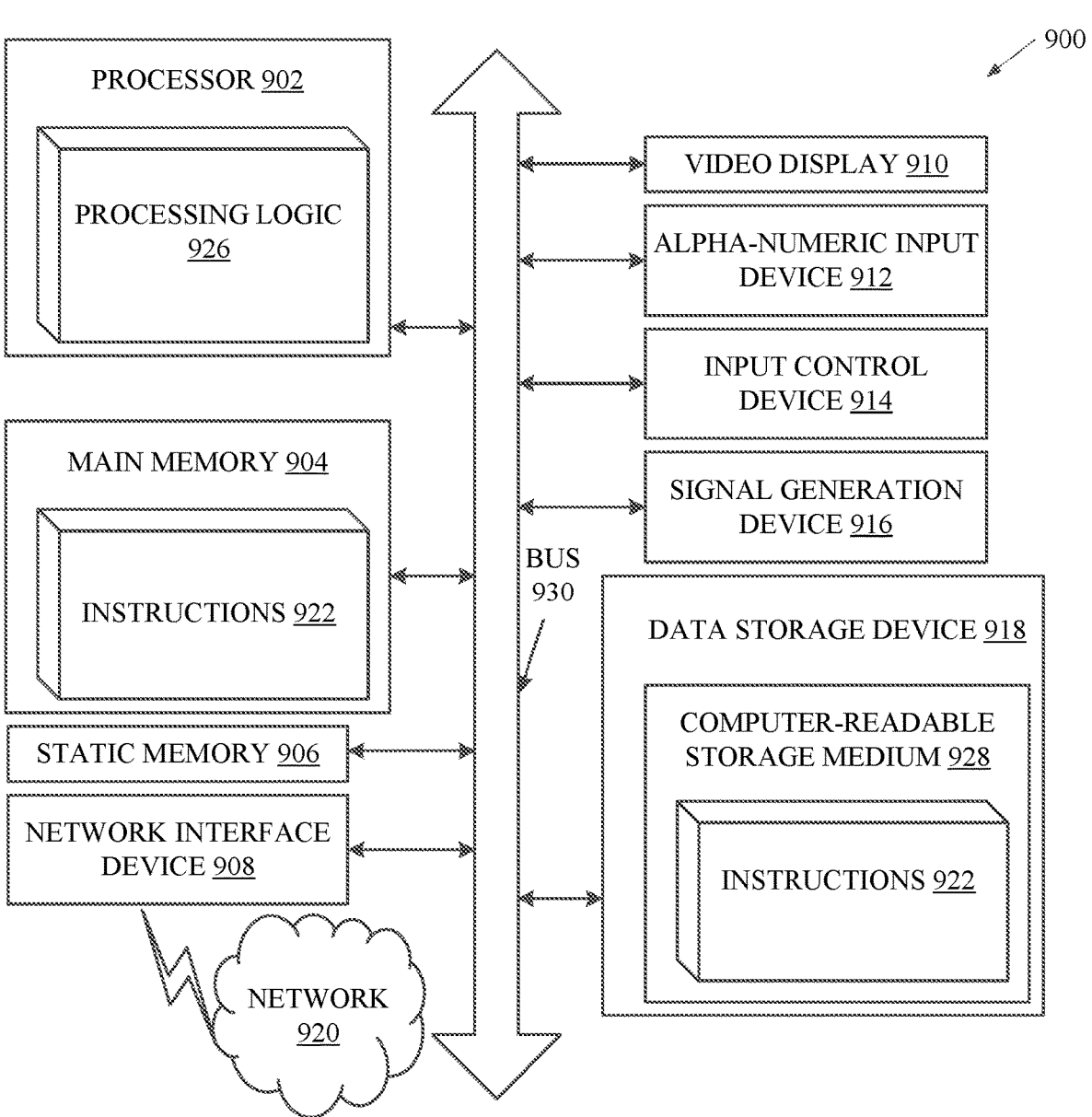
FIG. 9 depicts a block diagram of an example processing device operating in accordance with one or more embodiments of the present disclosure.

FIG. 9 depicts a block diagram of an example processing device 900 operating in accordance with one or more aspects of the present disclosure. In one implementation, the processing device 900 may be a part of any computing device of FIG. 1, or any combination thereof. Example processing device 900 may be connected to other processing devices in a LAN, an intranet, an extranet, and/or the Internet. The processing device 900 may be a personal computer (PC), a set-top box (STB), a server, a network router, switch or bridge, or any device capable of executing a set of instructions (sequential or otherwise) that specify actions to be taken by that device. Further, while only a single example processing device is illustrated, the term "processing device" shall also be taken to include any collection of processing devices (e.g., computers) that individually or jointly execute a set (or multiple sets) of instructions to perform any one or more of the methods discussed herein.

Example processing device 900 may include a processor 902 (e.g., a CPU), a main memory 904 (e.g., read-only memory (ROM), flash memory, dynamic random access memory (DRAM) such as synchronous DRAM (SDRAM), etc.), a static memory 906 (e.g., flash memory, static random access memory (SRAM), etc.), and a secondary memory (e.g., a data storage device 918), which may communicate with each other via a bus 930.

Processor 902 represents one or more general-purpose processing devices such as a microprocessor, central processing unit, or the like. More particularly, processor 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 902 may also be one or more special-purpose processing devices such as an application specific integrated circuit (ASIC), a field programmable gate array (FPGA), a digital signal processor (DSP), network processor, or the like. In accordance with one or more aspects of the present disclosure, processor 902 may be configured to execute instructions (e.g. processing logic 926 may implement video suggestion engine 180 of FIG. 1).

Example processing device 900 may further include a network interface device 908, which may be communicatively coupled to a network 920. Example processing device 900 may further comprise a video display 910 (e.g., a liquid crystal display (LCD), a touch screen, or a cathode ray tube (CRT)), an alphanumeric input device 912 (e.g., a keyboard), an input control device 914 (e.g., a cursor control device, a touch-screen control device, a mouse), and a signal generation device 916 (e.g., an acoustic speaker).

Data storage device 918 may include a computer-readable storage medium (or, more specifically, a non-transitory computer-readable storage medium) 928 on which is stored one or more sets of executable instructions 922. In accordance with one or more aspects of the present disclosure, executable instructions 922 may comprise executable instructions (e.g. implementing suggestion engine 180 of FIG. 1).

Executable instructions 922 may also reside, completely or at least partially, within main memory 904 and/or within processor 902 during execution thereof by example processing device 900, main memory 904 and processor 902 also constituting computer-readable storage media. Executable instructions 922 may further be transmitted or received over a network via network interface device 908.

While the computer-readable storage medium 928 is shown in FIG. 9 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

It should be understood that the above description is intended to be illustrative, and not restrictive. Many other embodiment examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The embodiments of methods, hardware, software, firmware, or code set forth above may be implemented via instructions or code stored on a machine-accessible, machine readable, computer accessible, or computer readable medium which are executable by a processing element. "Memory" includes any mechanism that provides (i.e., stores and/or transmits) information in a form readable by a machine, such as a computer or electronic system. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment, embodiment, and/or other exemplarily language does not necessarily refer to the same embodiment or the same example, but may refer to different and distinct embodiments, as well as potentially the same embodiment.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such. Also, the terms "first," " "second," "third," "fourth," etc. as used herein are meant as labels to distinguish among different elements and may not necessarily have an ordinal meaning according to their numerical designation.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. The essential elements of a digital computer a central processing unit for performing or executing instructions and one or more memory devices for storing instructions and digital data. The central processing unit and the memory can be supplemented by, or incorporated in, special purpose logic circuitry or quantum simulators. Generally, a digital computer will also include, or be operatively coupled to receive digital data from or transfer digital data to, or both, one or more mass storage devices for storing digital data, e.g., magnetic, magneto-optical disks, optical disks, or systems suitable for storing information. However, a digital computer need not have such devices.

Digital computer-readable media suitable for storing digital computer program instructions and digital data include all forms of non-volatile digital memory, media, and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks.

Control of the various systems described in this specification, or portions of them, can be implemented in a digital computer program product that includes instructions that are stored on one or more non-transitory machine-readable storage media, and that are executable on one or more digital processing devices. The systems described in this specification, or portions of them, can each be implemented as an apparatus, method, or system that may include one or more digital processing devices and memory to store executable instructions to perform the operations described in this specification.

While this specification contains many specific embodiment details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for suggesting a video for viewing to a user of a video streaming platform, the method comprising:
   acquiring first comments from a first comments section associated with a first video;
   applying a first artificial intelligence (AI) model to the first comments to identify one or more first sentiment correlation indicators indicating a correlation between the first video and a sentiment, wherein the first AI model is trained, using historical user-generated comments labeled by a second AI model, to produce sentiment correlation indicators for a given video with an associated comments section;
   generating, using the one or more first sentiment correlation indicators, a first video sentiment score quantifying the correlation between the first video and the sentiment; and
   providing, using the first video sentiment score, the first video as a suggested video for viewing to the user of the video streaming platform.

2. The method of claim 1, wherein a sentiment correlation indicator of the one or more first sentiment correlation indicators comprises a portion of a comment of the first comments that indicates a correlation between the first video and the sentiment.

3. The method of claim 1, wherein the first video sentiment score comprises a measure of an amount of comments within the first comments section associated with the first video that indicate a correlation between the first video and the sentiment.

4. The method of claim 1, wherein the sentiment comprises at least one of happiness, nostalgia, comedy, romance, or a sentiment associated with a genre of music.

5. The method of claim 1, further comprising:
   acquiring second comments from a second comments section associated with a second video;
   applying the first AI model to the second comments to identify one or more second sentiment correlation indicators indicating a correlation between the second video and the sentiment;
   generating, using the one or more identified second sentiment correlation indicators, a second video sentiment score quantifying the correlation between the second video and the sentiment; and
   providing, the first video as a suggested video for viewing to the user of the video streaming platform, responsive to a comparison between the first video sentiment score and the second video sentiment score.

6. The method of claim 5, wherein providing the first video as the suggested video is based at least on a determination that the first video sentiment score is higher than the second video sentiment score.

7. The method of claim 1, wherein the first AI model is pre-trained to identify sentiment correlation indicators within natural language text.

8. The method of claim 1, wherein the first comments comprise one or more user-posted emojis associated with the first comments section.

9. The method of claim 8, wherein the first AI model is trained by:
   generating a first training dataset comprising:
      a first plurality of training comments, and
      a first plurality of ground truth labels indicating whether a given comment of the first plurality of training comments correlates with the sentiment, wherein at least a subset of the first plurality of ground truth labels is generated using the second AI model; and
   training the first AI model using the first training dataset.

10. The method of claim 9, wherein the second AI model is trained by:
   generating a second training dataset comprising:
      a second plurality of training comments, and
      a second plurality of human-annotated ground truth labels indicating whether a respective comment of the second plurality of training comments correlates with the sentiment; and
   training the second AI model using the second training dataset.

11. The method of claim 9, wherein training the first AI model using the first training dataset comprises:
   processing, using the first AI model, the given comment to generate a training label indicating whether the given comment correlates with the sentiment;
   identifying a difference between the training label and the ground truth label of the first plurality of ground truth labels; and
   changing one or more parameters of the first AI model to reduce or eliminate the identified difference.

12. The method of claim 9, wherein the first AI model is trained until the first AI model achieves an accuracy threshold on a validation dataset.

13. The method of claim 9, wherein a number of parameters of the second AI model is at least a predefined number of times larger than a number of parameters of the first AI model.

14. A method for suggesting a video for viewing to a user of a video streaming platform, the method comprising:

acquiring video content data associated with a video;

applying a first artificial intelligence (AI) model to the video content data to generate a video sentiment score quantifying a correlation between the video and a sentiment, wherein the first AI model is trained, using historical video content data comprising user-generated comments labeled by a second AI model, to produce sentiment correlation indicators for a given video with associated video content data; and providing, using the video sentiment score, the video as a suggested video for viewing to the user of the video streaming platform.

15. The method of claim 14, further comprising:

generating a first training dataset comprising:

a plurality of training comments, wherein each comment of the plurality of training comments is associated with a video of a plurality of videos, and a first plurality of ground truth labels indicating whether a given comment of the plurality of training comments correlates a respective associated video of the plurality of videos with the sentiment, wherein at least a subset of the first plurality of ground truth labels is generated using the second AI model;

generating, using the first training dataset, a plurality of sentiment scores quantifying a correlation between a given video of the plurality of videos and the sentiment;

generating a second training dataset comprising:

a plurality of training video content data, and a second plurality of ground truth labels indicating the sentiment score of the plurality of sentiment scores quantifying a correlation between a given video content data of the plurality of training video content data and the sentiment; and training the first AI model using the second training dataset.

16. The method of claim 15, wherein training the first AI model using the second training dataset comprises:

processing, using the first AI model, the given video content data to generate a video sentiment score quantifying the correlation between the given video content data and the sentiment;

identifying a difference between the generated video sentiment score and a respective ground truth label of the second plurality of ground truth labels; and changing one or more parameters of the first AI model to reduce or eliminate the identified difference.

17. A system for suggesting a video for viewing to a user of a video streaming platform, the system comprising:

a memory device; and a processing device communicatively coupled to the memory device, wherein the processing device is to:

acquire first comments from a first comments section associated with a first video;

apply a first artificial intelligence (AI) model to the first comments to identify one or more first sentiment correlation indicators indicating a correlation between the first video and a sentiment, wherein the first AI model is trained, using historical user-generated comments labeled by a second AI model, to produce sentiment correlation indicators for a given video with an associated comments section;

generate, using the one or more first sentiment correlation indicators, a first video sentiment score quantifying the correlation between the first video and the sentiment; and provide, using the first video sentiment score, the first video as a suggested video for viewing to the user of the video streaming platform.

18. The system of claim 17, wherein the processing device is to further:

acquire second comments from a second comments section associated with a second video;

apply the first AI model to the second comments to identify one or more second sentiment correlation indicators indicating a correlation between the second video and the sentiment;

generate, using the one or more identified second sentiment correlation indicators, a second video sentiment score quantifying the correlation between the second video and the sentiment; and provide, the first video as a suggested video for viewing to the user of the video streaming platform, responsive to a comparison between the first video sentiment score and the second video sentiment score.

19. The system of claim 17, wherein the first AI model is trained by:

generating a first training dataset comprising:

a first plurality of training comments, and a first plurality of ground truth labels indicating whether a given comment of the first plurality of training comments correlates with the sentiment, wherein at least a subset of the first plurality of ground truth labels is generated using the second AI model; and training the first AI model using the first training dataset.

20. The system of claim 19, wherein the second AI model is trained by:

generating a second training dataset comprising:

a second plurality of training comments, and a second plurality of human-annotated ground truth labels indicating whether a respective comment of the second plurality of training comments correlates with the sentiment; and training the second AI model using the second training dataset.

\* \* \* \* \*